United States Patent
Mason

(10) Patent No.: US 12,033,226 B2
(45) Date of Patent: Jul. 9, 2024

(54) SMART WATER MONITORING AND LEAK DETECTION SYSTEM

(71) Applicant: NIBCO INC., Elkhart, IN (US)

(72) Inventor: Christopher William Mason, Granger, IN (US)

(73) Assignee: NIBCO, INC., Elkhart, IN (US)

( * ) Notice: Subject to any disclaimer, the term of this patent is extended or adjusted under 35 U.S.C. 154(b) by 256 days.

(21) Appl. No.: 16/995,207

(22) Filed: Aug. 17, 2020

(65) Prior Publication Data

US 2022/0051351 A1 Feb. 17, 2022

(51) Int. Cl.
| | |
|---|---|
| G08B 21/00 | (2006.01) |
| G01F 15/063 | (2022.01) |
| G06Q 50/06 | (2012.01) |
| G01D 4/00 | (2006.01) |
| G01F 15/00 | (2006.01) |

(52) U.S. Cl.
CPC .......... *G06Q 50/06* (2013.01); *G01F 15/063* (2013.01); *G01D 4/004* (2013.01); *G01F 15/005* (2013.01)

(58) Field of Classification Search
CPC ..... G06Q 50/06; G01F 15/063; G01F 15/005; G01D 4/004
USPC ........................................................ 340/606
See application file for complete search history.

(56) References Cited

U.S. PATENT DOCUMENTS

| | | | |
|---|---|---|---|
| 5,971,011 A | 10/1999 | Price | |
| 6,102,061 A | 8/2000 | Addink | |
| 6,298,285 B1 | 10/2001 | Addink et al. | |
| 6,520,003 B1 | 2/2003 | Fox | |
| 6,657,552 B2 | 12/2003 | Belski et al. | |
| 6,944,523 B2 | 9/2005 | Addink et al. | |
| 6,963,808 B1 | 11/2005 | Addink et al. | |
| 7,100,427 B2 | 9/2006 | Kahn et al. | |
| 7,330,796 B2 | 2/2008 | Addink et al. | |
| 7,436,321 B2 | 10/2008 | White, II et al. | |
| 7,669,461 B2 | 3/2010 | Kates | |
| 7,711,454 B2 | 5/2010 | Addink | |
| 8,347,427 B2 | 1/2013 | Klicpera | |
| 8,887,324 B2 | 11/2014 | Klicpera | |
| 8,893,320 B2 | 11/2014 | Klicpera | |
| 9,061,307 B2 | 6/2015 | Klicpera et al. | |
| 9,250,105 B2 | 2/2016 | Patel et al. | |
| 9,254,499 B2 | 2/2016 | Klicpera | |
| 9,266,136 B2 | 2/2016 | Klicpera | |
| 9,297,150 B2 | 3/2016 | Klicpera | |
| 9,324,228 B2 | 4/2016 | Trout | |

(Continued)

FOREIGN PATENT DOCUMENTS

WO 2006042053 A2 4/2006

*Primary Examiner* — Naomi J Small
(74) *Attorney, Agent, or Firm* — Price Heneveld LLP

(57) ABSTRACT

A water supply monitoring system in connection with a supply line includes a fluid sensor configured to identify flow rate data identifying a flow rate of water through the supply line. A controller is configured to receive the flow rate data from the fluid sensor and compare the flow rate data over time to a plurality of flow rate models. The flow rate models define flow rate characteristics of a plurality of preconfigured water implements. The controller is further configured to classify a water consumption identified by the flow rate data as being consumed by a plurality of consumption implements in connection with the supply line in a plurality of consumption classifications.

15 Claims, 16 Drawing Sheets

(56) References Cited

U.S. PATENT DOCUMENTS

| | | |
|---|---|---|
| 9,494,480 B2 | 11/2016 | Klicpera |
| 9,749,792 B2 | 8/2017 | Klicpera |
| 9,928,724 B2 | 3/2018 | Alcorn et al. |
| 10,229,579 B2 | 3/2019 | Alcorn et al. |
| 10,352,814 B2 | 7/2019 | Enev et al. |
| 10,378,940 B2 | 8/2019 | Leaders et al. |
| 10,410,501 B2 | 9/2019 | Klicpera |
| 10,489,038 B2 | 11/2019 | Klicpera |
| 10,642,289 B1 * | 5/2020 | Reeder .............. G05D 23/1366 |
| 10,671,502 B1 * | 6/2020 | Haslam .............. G06F 11/3089 |
| 10,837,160 B2 * | 11/2020 | Hammond ................ G01F 1/66 |
| 2002/0010516 A1 | 1/2002 | Addink et al. |
| 2003/0070438 A1 * | 4/2003 | Kikuchi .................. F24F 11/30 |
| | | 62/157 |
| 2004/0128034 A1 | 7/2004 | Lenker et al. |
| 2006/0174707 A1 | 8/2006 | Zhang |
| 2009/0194719 A1 | 8/2009 | Mulligan |
| 2016/0041565 A1 | 2/2016 | Edwards |
| 2016/0069048 A1 | 3/2016 | Colbert et al. |
| 2019/0234786 A1 | 8/2019 | Klicpera |
| 2019/0281371 A1 | 9/2019 | Klicpera |
| 2020/0133315 A1 | 4/2020 | Rasmussen et al. |
| 2020/0264067 A1 * | 8/2020 | Lance .................. G05D 7/0629 |
| 2020/0292408 A1 * | 9/2020 | Boston ................ G08B 21/187 |
| 2020/0326216 A1 * | 10/2020 | Sarkissian ............. G06Q 50/06 |

* cited by examiner

SMART WATER MONITORING AND LEAK DETECTION SYSTEM

TECHNOLOGICAL FIELD

The disclosure relates to a fluid supply monitoring system and, more particularly, to a monitoring system configured to detect and isolate leaks from a fluid supply.

BACKGROUND

The present disclosure generally relates to a fluid supply monitoring and isolation device. The fluid monitoring aspects of the disclosure provide valuable information that may assist in conserving water and limiting corresponding expenses. As further discussed in the detailed description, the system may further provide for an identification problematic conditions that could result in property damage.

SUMMARY

In at least one aspect, a water supply monitoring system in connection with a supply line is disclosed. The system includes a fluid sensor configured to identify flow rate data identifying a flow rate of water through the supply line. A controller is configured to receive the flow rate data from the fluid sensor and compare the flow rate data over time to a plurality of flow rate models. The flow rate models define flow rate characteristics of a plurality of preconfigured water implements. The controller is further configured to classify a water consumption identified by the flow rate data as being consumed by a plurality of consumption implements in connection with the supply line in a plurality of consumption classifications.

In at least another aspect, a method for monitoring a supply line is disclosed. The method comprises receiving flow rate data from a fluid sensor and comparing the flow rate data over time to a plurality of flow rate models. The flow rate models define flow rate characteristics of a plurality of preconfigured water implements. The method further comprises classifying water consumption identified by the flow rate data as being consumed by each of a plurality of consumption implements in connection with the supply line in a plurality of consumption classifications and identifying proportions of the water consumption attributed to each of the consumption classifications as classified consumption data. The method further comprises comparing the flow rate data for the plurality of consumption classifications to historic data and identifying a change in the water consumption associated with at least one of the plurality of consumption classifications based on the comparison.

In yet another aspect, a water supply monitoring system in connection with a supply line is disclosed. The system comprises a fluid sensor configured to identify flow rate data identifying a flow rate of water through the supply line and a controller. The controller is configured to receive the flow rate data from the fluid sensor and compare the flow rate data over time to a plurality of flow rate models. The flow rate models define flow rate characteristics of a plurality of preconfigured water implements. The controller is further configured to classify water consumption identified by the flow rate data as being consumed by a plurality of consumption implements in connection with the supply line in a plurality of consumption classifications and identify proportions of the water consumption attributed to each of the consumption classifications as classified consumption data. The controller is further configured to update at least one of the flow rate models to generate an optimized consumption model for at least one of the consumption implements based on the classified consumption data.

These and other features, advantages, and objects of the present device will be further understood and appreciated by those skilled in the art upon studying the following specification, claims, and appended drawings.

DETAILED DESCRIPTION OF EMBODIMENTS

Figure 1:
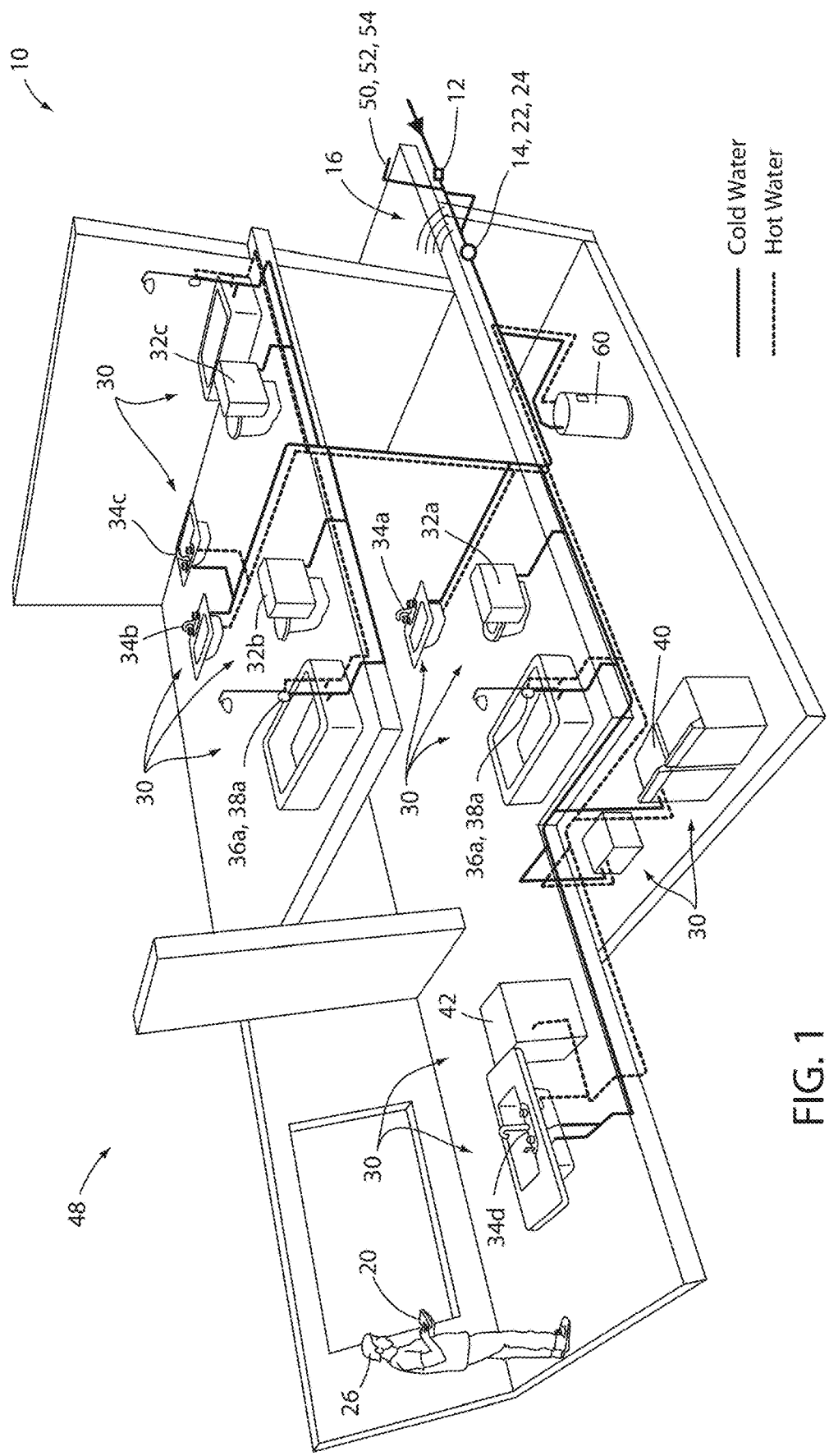
FIG. 1 is a projected view of a water supply system including a monitoring system.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Referring generally to FIGS. 1-13, the disclosure provides for a monitoring and control system 10 configured to detect various attributes of a fluid delivered through a supply line 12 and control the passage of the fluid based on the detected attributes, as well as one or more manual or remote inputs. As demonstrated in FIGS. 1-3, the monitoring system 10 may comprise a monitoring apparatus 14 in connection with the supply line 12. In various implementations, the monitoring apparatus 14 may be configured to wirelessly communicate via a device network 16, which may be facilitated by a local device hub 18. As later discussed in reference to FIG. 15, the local device hub 18 may correspond to a wireless router, which may be in communication with a plurality of electronic devices (e.g., smart devices), and may also be in communication with a mobile device 20 and/or a remote server providing remote access and communication with the monitoring apparatus 14. Accordingly, the system 10 may provide for remote monitoring and control of the supply line 12 via the mobile device 20.

In some instances, the monitoring system 10 may detect the attributes of the fluid in the supply line 12 to identify a warning state or an excessive flow condition. The attributes of the fluid may be monitored via a plurality of sensors 22 incorporated in the monitoring apparatus 14 and in connection with the supply line 12. In this configuration the excess flow or warning state may be identified as a fluid leak supplied from the supply line 12. In response to the excess flow condition, a controller of the monitoring apparatus 14 may be configured to control the flow of the fluid through the supply line 12 by actuating a valve 24. The attributes of the fluid delivered by the apparatus 14 may include a flow rate, a fluid pressure, a temperature, and other attributes of the fluid. Further detailed discussion regarding the controller of the monitoring apparatus 14, the device network 16, and various aspects of the system 10 are further discussed in reference to FIG. 16.

In some cases, the system 10 may further be configured to identify whether a potential fluid leak associated with the supply line 12 is an actual fluid leak based on sensor data communicated by the sensors 22. By inferring information from the combined operation of the sensors 22, the controller of the system 10 may be operable to identify that a potential leak is actually related to a sensor failure rather than a leak condition. In addition to distinguishing an actual leak from a potential leak, the controller of the system 10 may also be configured to identify and distinguish failures related to the operation of a pressure sensor 22a, a fluid sensor 22b, and/or a failure of the valve 24. Accordingly, the system 10 may be configured to identify a variety of conditions of the fluid as well as the operation of the monitoring apparatus 14 by making intelligent inferences based on the data communicated from the sensors 22. Such operation not only allows a user 26 to remotely monitor and control the system 10 via the mobile device 20 but also ensures that the information reported to the user 26 does not result in false alarms that may otherwise significantly limit the trustworthiness and corresponding benefit of the information provided by the system 10.

In addition to identifying potential fluid leaks and monitoring the operating status of the monitoring apparatus 14, the system 10 may further be configured to identify instances of fluid flow of the fluid communicated via the supply line 12 and classify the water or fluid consumed as being attributed to various consumption implements 30 supplied with fluid via the supply line 12. As demonstrated in FIG. 1, the consumption implements 30 may include, but are not limited to, a toilet 32, a faucet 34, a shower 36, a bathtub 38, and a plurality of appliances. The appliances may include a clothes washer 40, a dishwasher 42, a humidifier 44, and various other appliances that may receive fluid from the supply line 12. In some cases, the system 10 may additionally be configured to monitor fluid supplied via the supply line 12 to consumption implements that may be outside a building 48 or dwelling. For example, the system 10 may also be configured to identify fluid supplied to an exterior spigot 50, an irrigation system 52, a pool or hot tub supply 54, or various other consumption implements 30.

In order to identify the portions of the fluid consumed and/or delivered to the various consumption implements 30, the system 10 may compare the flow rate of the fluid identified by the fluid sensor 22b to various consumption models or flow rate profiles. In this way, the system identifies flow data that is characteristic or identifiable as corresponding to behavior that can be associated or attributed to one or more specific consumption implements 30 and/or classifications of fluid consumption as further discussed herein. In various examples, the system 10 may provide for detailed monitoring of the fluid supplied via the supply line 12, detailed analysis of classes or specific consumption implements 30 responsible for the consumption, and comparative analysis information that may identify variations and/or inefficiencies in the use of the water or fluid delivered via the supply line 12.

As later discussed, in some implementations, the system 10 may initially classify the fluid consumption in general use categories that may correspond to preconfigured or preloaded flow rate profiles or consumption models. Such preconfigured consumption models may generally outline ranges of characteristic flow data over time that represents the characteristic flowrate associated with each of the consumption implements 30. For example, the system 10 may begin by categorizing the consumption of each of the toilets 32 in a combined consumption group. However, by monitoring and recording the characteristic behavior of each of a first toilet 32*a*, a second toilet 32*b*, and a third toilet 32*c*, the controller of the system 10 may detect and learn identifiable characteristics of the flow data associated with each of the individual toilets 32, such that the operation of each of the toilets 32 may be distinguished and separately classified. Similarly, the controller of the system 10 may be operable to distinguish the characteristic flow rate of a first bathtub 38*a* from a second bathtub 38*b* and, in some cases, may be operable to distinguish the characteristic flow rates of each of a first faucet 34*a*, a second faucet 34*b*, a third faucet 34*c*, and/or a fourth faucet 34*d*. Though in some cases the flow rate associated with one or more of the toilets 32 or faucets 34 may not be readily distinguishable based solely on the flow rates identified by the fluid sensor 22*b*, the system 10 may distinguish and classify the consumption associated with a variety of the consumption implements 30 by generating implement specific consumption models that may be applied to categorize the fluid use among each of the consumption implements 30. In this way, the system 10 may identify and record the use or flow instances associated with specific implements (e.g., the first toilet 32*a*) in connection with the supply line 12.

Figure 2:
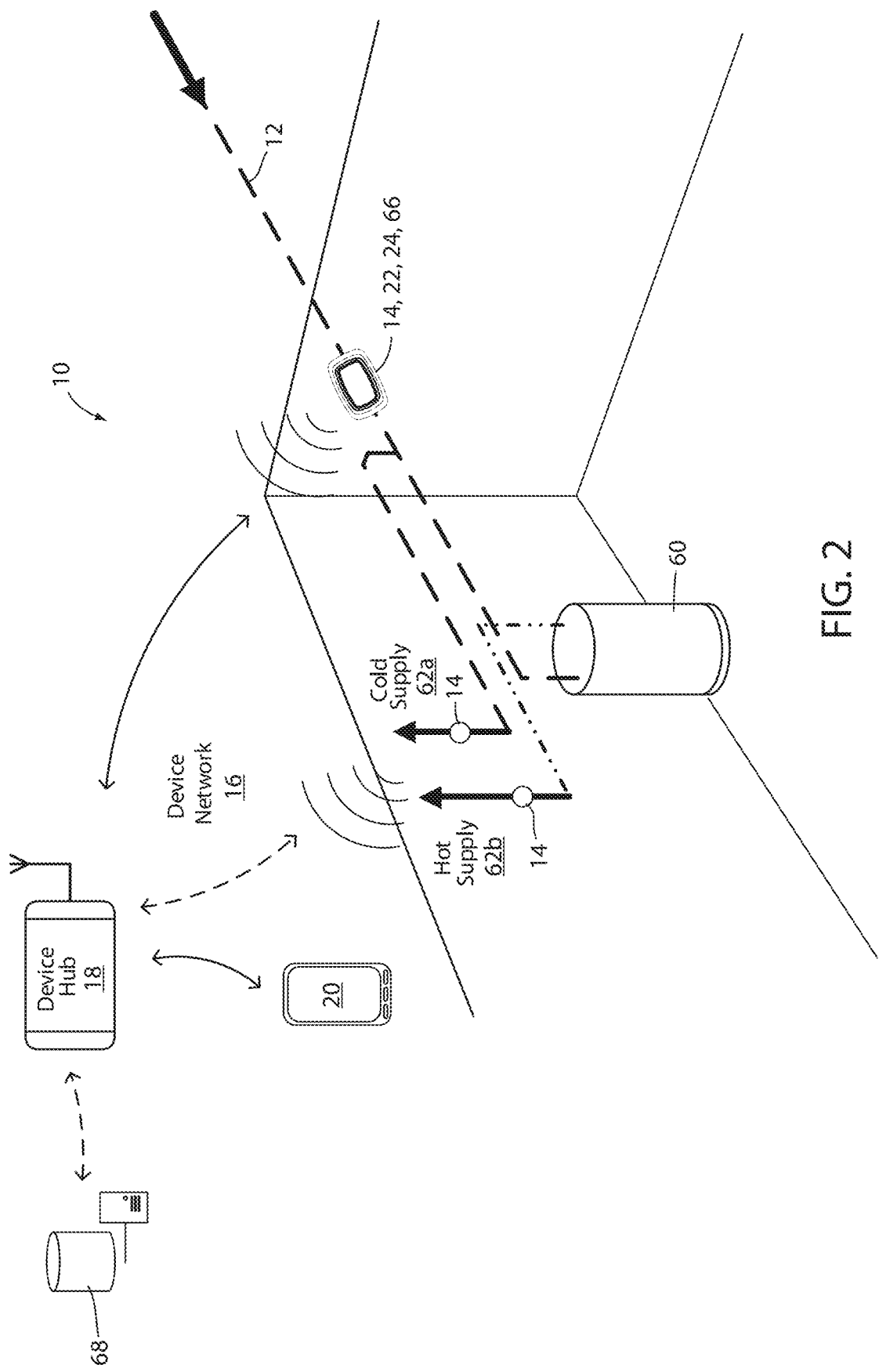
FIG. 2 is a simplified projected view of a monitoring system demonstrating a control apparatus in wireless communication with a device network.

Referring now to FIG. 2, a simplified diagram demonstrating the monitoring apparatus 14 is shown in connection with the supply line 12. In a typical installation, the monitoring apparatus 14 may be installed in-line with the supply line 12 inside or outside the building 48. In a conventional installation, the monitoring apparatus 14 may supply water or fluid to a water heater 60 in connection with one or more of the consumption implements 30. In such cases, a cold water supply 62*a* and a hot water supply 62*b* may be supplied with fluid through the monitoring apparatus 14 via the supply line 12. In some cases, a plurality of the monitoring apparatuses 14 may be separately connected to monitor the cold water supply 62*a* separate from the hot water supply 62*b*. Each of the monitoring apparatuses 14 may communicate the flow rate information captures via the fluid sensor 22*b*, as well as the additional sensor data, to a central controller 66 or remote server 68. In this configuration, the combined information may further be analyzed to classify the hot and cold water consumed by the various consumption implements 30 and provide further characteristic information that may be compared to the flow rate profiles or consumption models, as well as tune the implement specific consumption profiles for each of the consumption implements 30. Additionally, as depicted in reference to FIG. 1, additional monitoring apparatuses 14 or application sensors may be connected with supply lines delivering fluid to specific consumption implements 30 or groups of the consumption implements 30. Accordingly, the system 10 may include one or more of the monitoring apparatuses 14 to provide a scalable solution to provide further detailed analysis and/or be implemented in large scale operating environments.

Figures 3A, 3B:
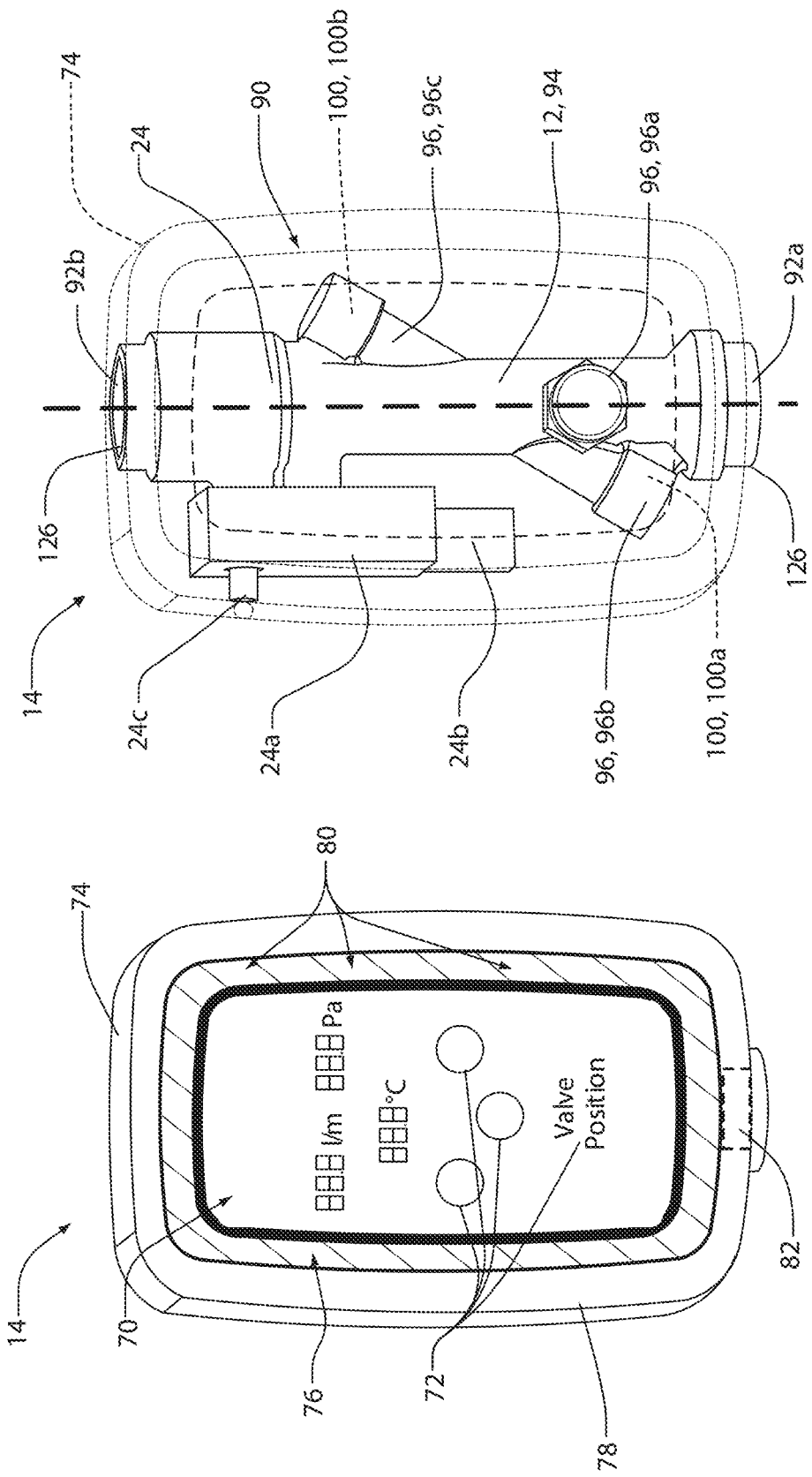
FIG. 3A is a projected view of a monitoring and control apparatus.
FIG. 3B is a partially transparent view of a monitoring and control apparatus demonstrating a control valve and sensors in connection with a supply line.

Referring now to FIGS. 3A, 3B, and 4-6, an exemplary embodiment of the monitoring apparatus 14 is shown in various views and levels of detail. As demonstrated in FIG. 3A, the monitoring apparatus 14 includes an indictor display 70 that displays the pressure detected by the pressure sensor 22*a*, the flow rate identified by the fluid sensor 22*b*, and a temperature identified by a temperature sensor 22*c*. Accordingly, the indicator display 70 may comprise one or more alpha/numeric LCDs (e.g., liquid crystal displays), as well as one or more indicators 72 configured to illuminate and identify the operating status of the monitoring apparatus 14. For example, the indicators 72 may be selectively illuminated by the controller of the monitoring apparatus 14 to identify a freeze warning, a connection status to the device network 16, and an operating status of the system 10 and/or the supply line 12. As shown in FIG. 3A, the indicators 72 also include a valve position indicator configured to identify whether the valve 24 is in an open position or a closed position. Accordingly, the indicator display 70 and the indicators 72, may be incorporated on a housing 74 of the monitoring apparatus 14, such that the status of the apparatus 14 and, more generally, the system 10 may be readily identifiable based on the visible representations on the indicator display 70.

In some implementations, a recessed trough 76 may be formed by the housing 74 about a perimeter of the indicator display 70. The recessed trough 76 may extend to a perimeter bezel 78, which may extend about an outer perimeter of a front face of the housing 74. Within the recessed trough 76, the monitoring apparatus 14 may further include a status indicator 80. The status indicator 80 may extend along the recessed trough 76 proximate to the indicator display 70, such that illumination emitted from the status indicator 80 may evenly illuminate the recessed trough 76 about the entirety of the indicator display 70. The status indictor 80 may correspond to one or more multi-colored light emitters (e.g., red-green-blue [RGB] light emitting diodes) configured to illuminate the recessed trough 76 in a plurality of colors of light. In order to provide for consistent illumination of the recessed trough 76, the status indicator may include a diffusing layer or light guide configured to blend light from individual emitters and create a halo effect.

In operation, the controller of the monitoring apparatus 14 may control the status indicator 80 to illuminate the recessed trough 76 in a green color identifying a fully operational status, a yellow color identifying a warning status, and/or a red color representing a failure or leak status attributed to the operation of the system 10 and/or the apparatus 14. In some cases, a communication port 82 may also be accessible via an opening or door formed in the perimeter bezel 78. The communication port 82 may be provided to support local diagnostic communication with the monitoring apparatus 14 and may be implemented via a variety of communication standards (e.g., serial communication, parallel communication, Ethernet, etc.). In addition to the visible indicators 72, the monitoring apparatus 14 may also include one or more speakers and/or buzzers configured to emit audible indications identifying the operation of the monitoring apparatus 14.

As shown in FIG. 3B, the housing 74 is depicted in hidden lines demonstrating a relationship between a valve and sensor assembly 90 of the monitoring apparatus 14 in relation to the body of the housing 74. In the depicted example, the assembly 90 is largely enclosed within the housing 74, such that the sensor and valve assembly 90 is protected and not readily visible when viewing the indicator display 70. In order to connect to the supply line 12, the monitoring apparatus 14 comprises connection fittings 92 between which a central line 94 extends. Accordingly, the assembly 90 is configured to connect in-line with the supply line 12. In this configuration, the monitoring apparatus 14 may be implemented without occupying significant space and without interrupting the flow from the supply line.

As previously discussed, the valve 24 is configured to selectively open and close the flow path of the fluid through the central line 94 in the event of a leak condition, a testing operation, and/or based on a user setting. The controller may control a valve actuator 24a by supplying a control signal to a solenoid 24b. In addition to the solenoid 24b, the valve 24 may further include a manual actuator 24c, which may be accessible via an opening formed in a side portion of the housing 74. In an exemplary embodiment, the valve 24 may correspond to a quarter-turn ball valve, such that the valve may be rapidly opened or closed in response to a leak detection. In some examples, the valve 24 may similarly be implemented as a compression valve or any suitable device that may control or selectively suppress a flow of the fluid through the central line 94.

In addition to the valve 24, a plurality of ports 96, may be in connection with the central line 94. A first port 96a may be formed approximately perpendicular to the central line 94 and may provide for a sealed connection of the pressure sensor 22a and/or the temperature sensor 22c with the fluid environment contained with the central line 94. Additionally, a second port 96b and a third port 96c may extend from the central line 94 at acute angles on opposing sides of the central line 94. The second port 96b and the third port 96c may each be configured to sealably house an ultrasonic sensor 100. In this configuration, the ultrasonic sensors 100 are aligned on opposite sides of a fluid flow through the central line 94 to form the fluid sensor 22b. Accordingly, each of the ports 96 formed in the sensor and valve assembly 90 may provide access for the sensors 22 to monitor the attributes of the fluid flowing through the central line 94 and thereby enable the controller of the monitoring apparatus 14 to receive sensor data from the sensors 22.

Referring again to FIGS. 3A, 3B, and 4-6, further details of the sensor and valve assembly 90 are discussed in reference to the various views depicted. The ultrasonic sensors 100 forming the fluid sensor 22b may each correspond to transmitter receivers (i.e., transceivers) located on opposing sides of the central line 94. In this configuration, the fluid sensor 22b may be configured to detect the flow rate of the fluid through the central line 94 based on a time-of-flight principle. In operation, each of the transmitters of the ultrasonic sensors 100 may emit ultrasonic waves across the fluid therebetween and receive waves from the opposing ultrasonic sensor 100. The fluid velocity of the fluid traveling through the central line 94 is then calculated by the controller of the monitoring apparatus 14 by detecting a difference in the frequency of the ultrasonic waves arriving at each of the receivers of the ultrasonic sensors 100. In this way, the monitoring system 10 calculates the average fluid velocity of the fluid traveling through the central line 94 and the corresponding flow rate of the fluid passing through the supply line 12. In an exemplary implementation, the fluid sensor 22b may be operable to detect the flow rate of the fluid at a rate as low as approximately 0.001 liters (L)/minute or 0.005 GPM. Though discussed in reference to a time-of-flight based detection, the fluid sensor 22b may also be configured to detect the flow rate of the fluid based on a Doppler-effect principle. Accordingly, the fluid sensor 22b may be flexibly implemented to achieve a desired level of accuracy and economy based on the desired parameters of the monitoring system 10. Further detailed discussion regarding the controller of the monitoring apparatus 14, the device network 16, and various aspects of the system 10 are further discussed in reference to FIG. 16.

Each of the pressure sensor 22a and the temperature sensor 22c may be connected to the assembly 90 via the first port 96a connected perpendicular to the central line 94. In this configuration, each of the pressure sensor 22a and the temperature sensor 22c are exposed to the fluid environment within the central line 94. The pressure sensor 22a may include a diaphragm and a strain gauge including a sensory element or transducer (e.g., Piezo-resistive, capacitive, Piezo-electric, etc.) that outputs an electrical signal identifying the strain resulting from the pressure experienced within the central line 94. The temperature sensor 22c may correspond to a thermistor or thermally sensitive resistor or other forms of electrical temperature sensors that may vary an output temperature signal in response to the variations in temperature within the central line 94 as a result of changes in temperature of the fluid therein. Accordingly, the sensors 22 of the monitoring apparatus 14 are configured to monitor and report the attributes of the fluid passing through or occupying the central line 94 of the sensor and valve assembly 90.

Figure 4:
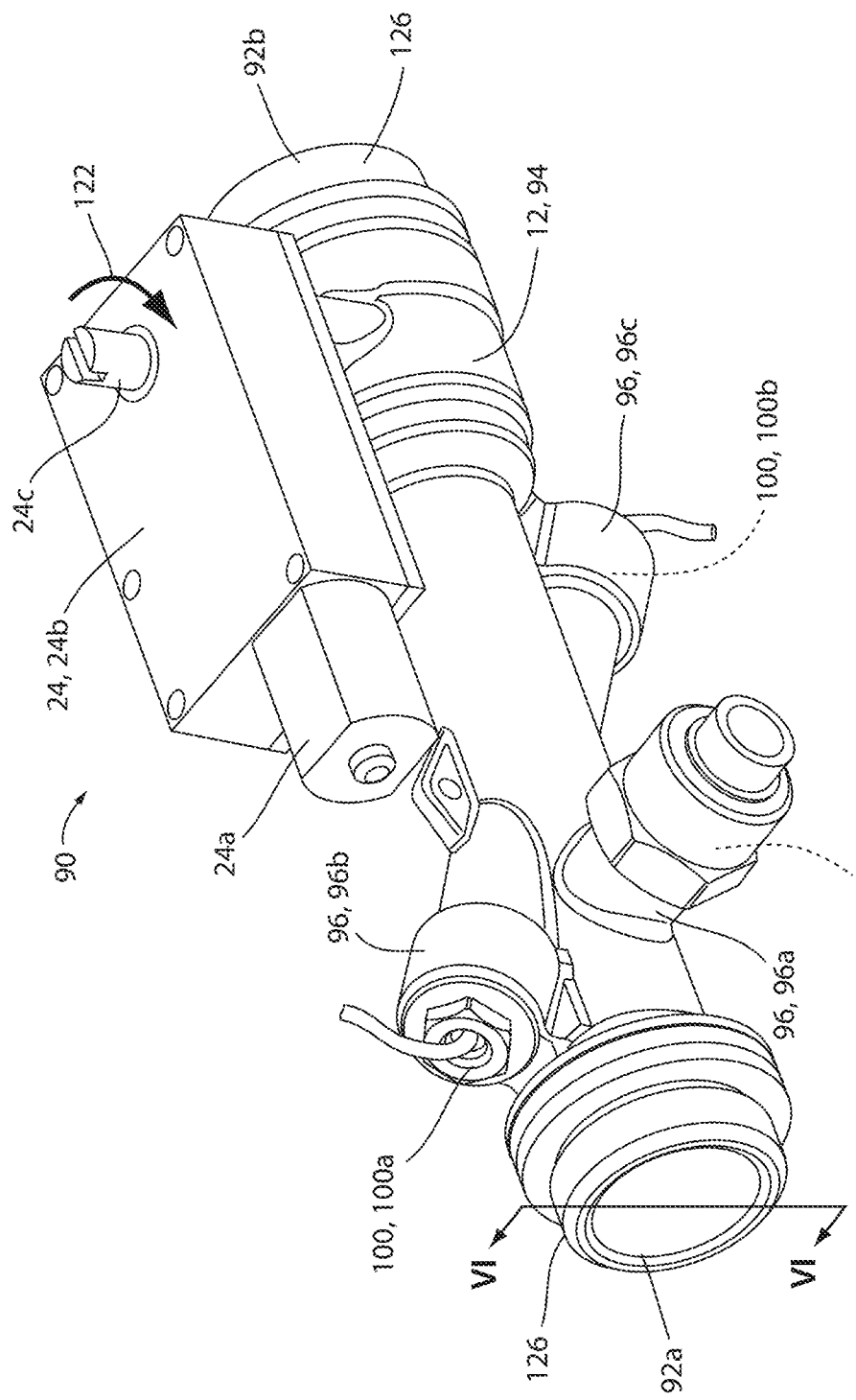
FIG. 4 is a projected partial assembly view of a monitoring and control apparatus.
Figure 5:
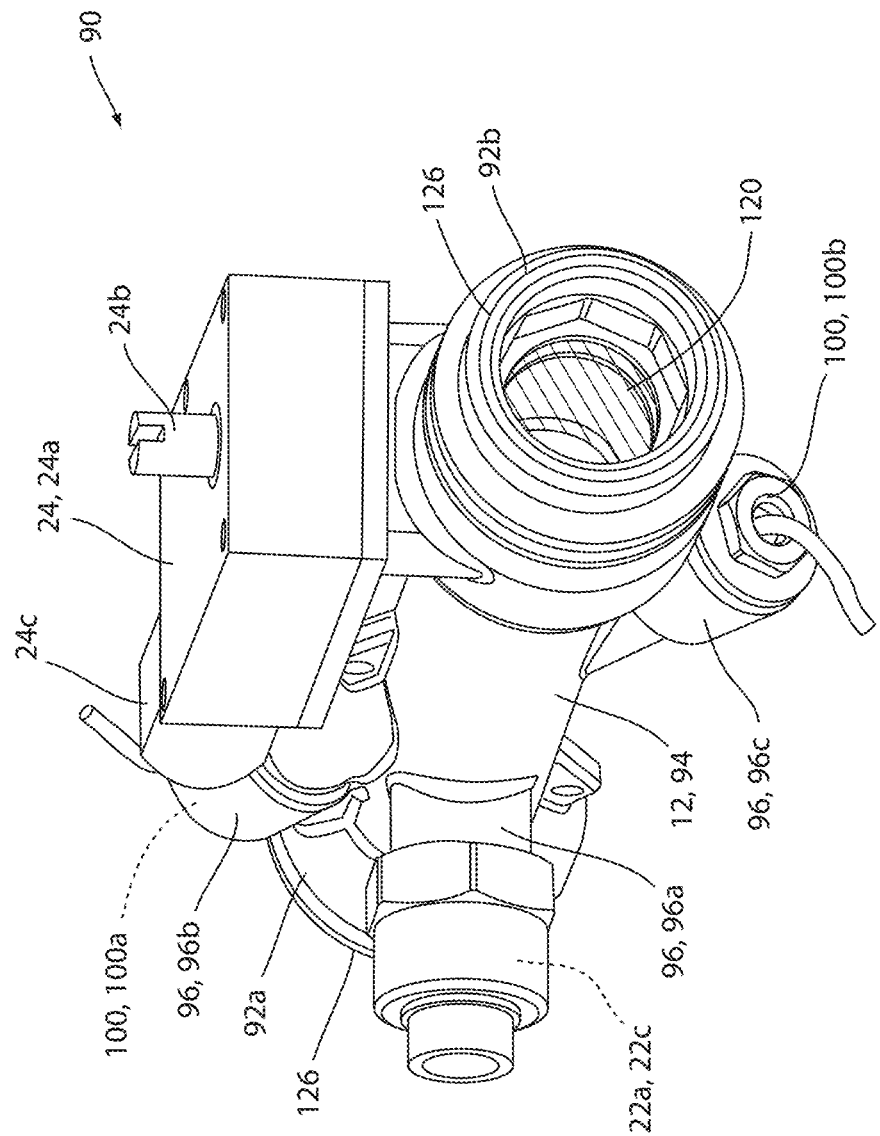
FIG. 5 is a projected partial assembly view of a monitoring and control apparatus.
Figure 6:
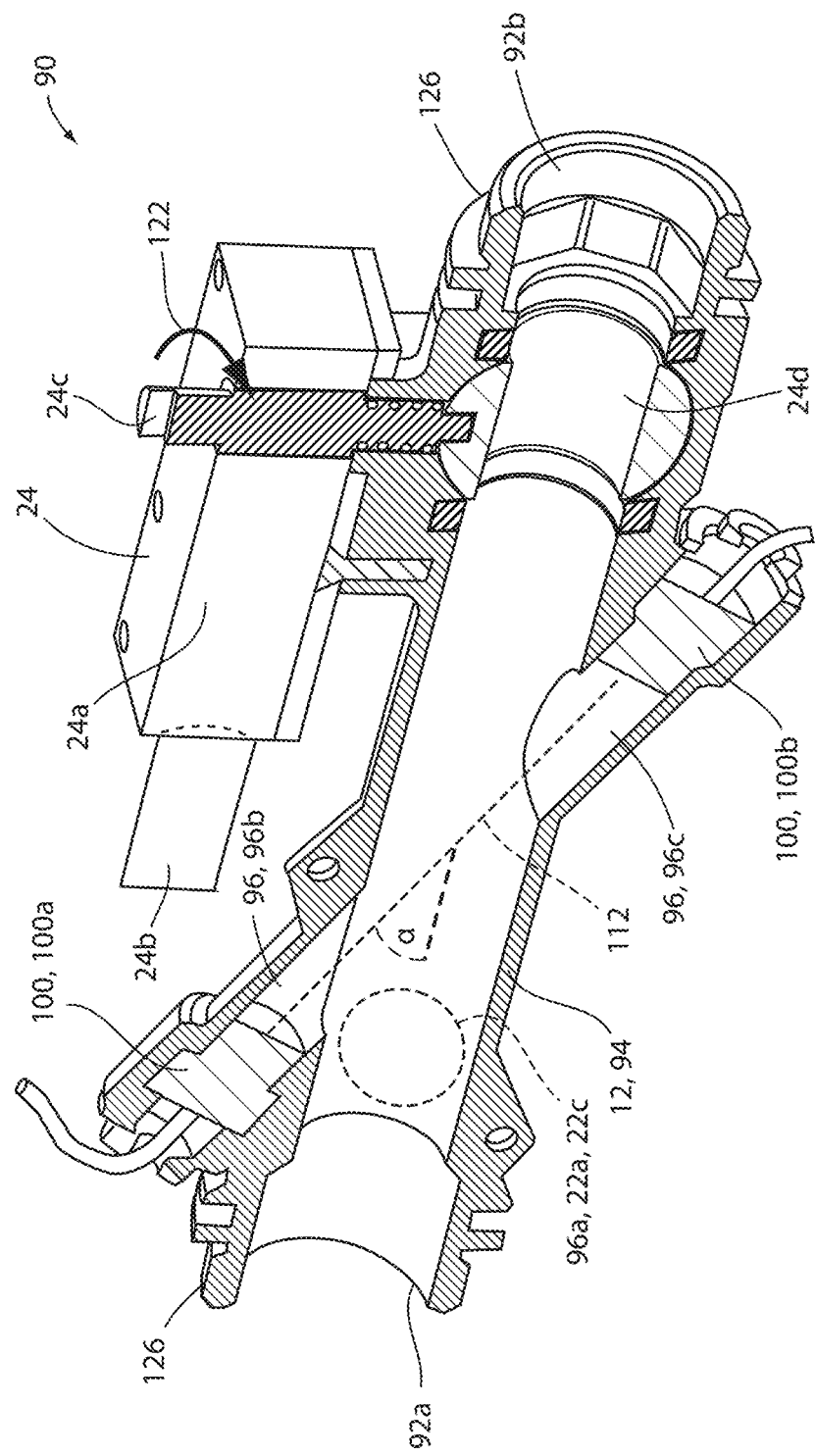
FIG. 6 is a cross-sectional view of a monitoring and control apparatus sectioned along line VI-VI demonstrated in FIG. 4.

Referring now to FIG. 6, a cross-sectional view of the sensor and valve assembly 90 is shown sectioned along section line VI-VI as depicted in FIG. 4. When fluid in the central line 94 is delivered to the consumption implements 30, the fluid travels though the central line 94 of the assembly 90 passing the first port 96a. The first port may house the pressure sensor 22a and the temperature sensor 22c and correspond to a location where the pressure data and temperature data of the fluid are detected and communicated to the controller of the monitoring apparatus 14. A transmission path 112 of the ultrasonic sensors 100 is aligned between the second port 96b and the third port 96c. An angle (a) of the transmission path 112 relative to the fluid flow may accordingly be varied based on the orientation of the second port 96b and the third port 96c relative to the central line 94. The angle (a) of the transmission path 112 may typically vary between approximately 30° and 45°, such that the difference in frequency of the sensors 100 may be distinguished based on the passage of the fluid between the sensors 100 along the transmission path 112. Accordingly, each of the sensors 22 may be connected to the central line 94 of the sensor and valve assembly 90, such that the attributes of the fluid passing through the assembly 90 are accurately detected and communicated to the controller of the monitoring apparatus 14. Though not depicted in the presently described figures, the controller of the monitoring apparatus 14 and further details of the construction and operation of the monitoring system 10 are further discussed in reference to FIG. 16.

The valve 24 is configured to control the passage of the fluid through the central line 94 and may be configured to provide a full-bore cross-section from the central line 94 when arranged in the open position (shown in FIG. 6). As previously discussed, the valve 24 may be implemented as a ball valve comprising a hollow pivoting ball 24d in connection with the valve actuator 24a. In this configuration, a control signal from the controller of the monitoring apparatus 14 is communicated to the solenoid 24b to control the valve actuator 24a to rotate the hollow pivoting ball 24d between an open position and a closed position with only a quarter-turn of rotation, as depicted by arrow 122. Additionally, the valve 24 includes a manual actuator 24c that may similarly rotate the valve actuator 24a to control the flow rate by adjusting the orientation of the hollow pivoting ball 24d. The manual actuator 24c may provide for operation of the valve 24 in the event of a power outage. Additionally, in some implementations, the monitoring apparatus 14 may comprise a battery backup that may maintain operation of the monitoring apparatus 14 and operation of the valve 24 in the event of a power outage or loss of connectivity via the device network 16.

Referring again to FIGS. 4-6, the sensor and valve assembly 90 may be formed by a lead-free, dezincification-resistant, forged brass valve-body with union end connections 126 at each of the connection fittings 92. In order to accommodate a variety of connections to the supply line 12, the connection fittings 92 may be offered in a variety of configurations, including sweat fittings, flare fittings, iron pipe size (IPS) fittings, pressed fittings, push fittings, cross-linked polyethylene (PEX) fittings, etc.). Accordingly, male threaded ends are provided at each of the connection fittings 92 to provide for reliable metal-to-metal connections to the sensor and valve assembly 90 and compatibility for a variety of applications.

Figure 7A:
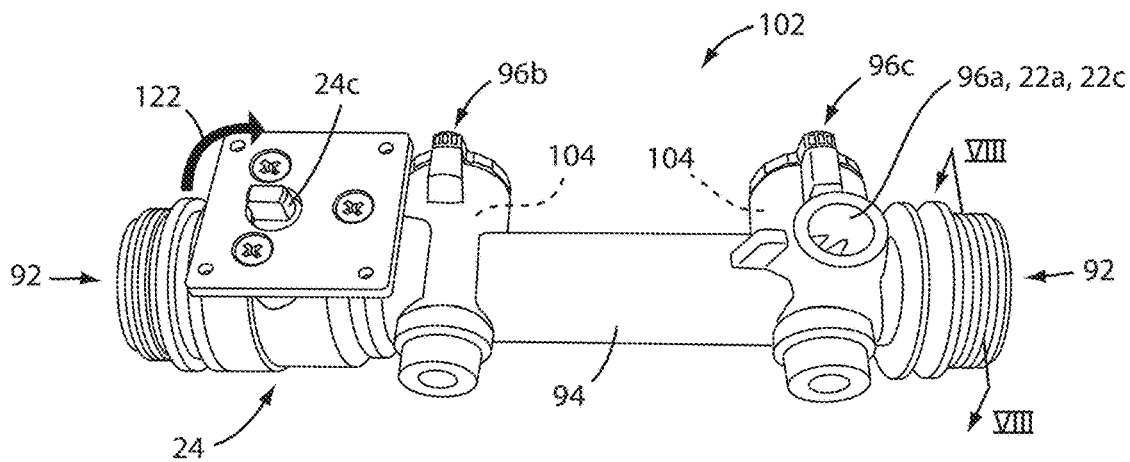
FIG. 7A is a projected partial assembly view of a monitoring and control apparatus.
Figure 7B:
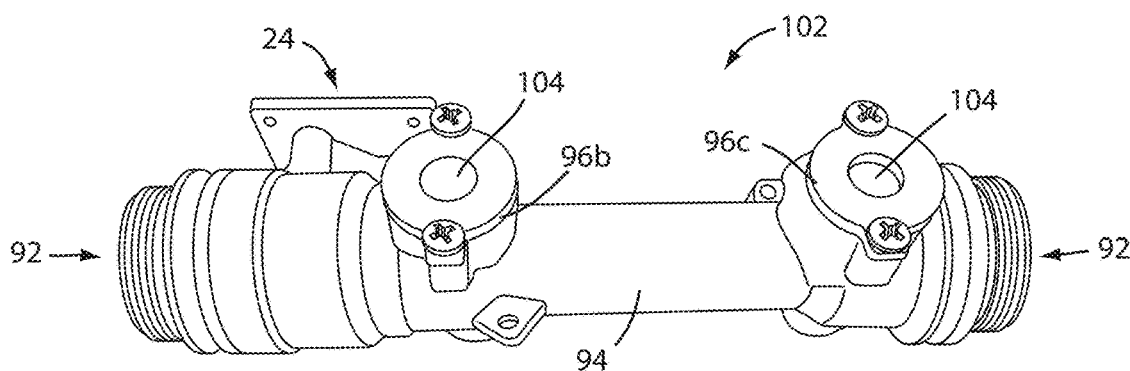
FIG. 7B is a projected partial assembly view of a monitoring and control apparatus.
Figure 8:
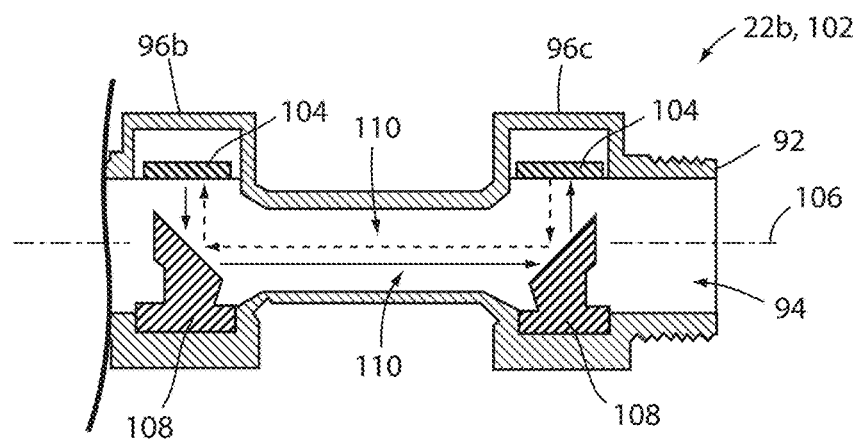
FIG. 8 is a cross-sectional view of a monitoring and control apparatus sectioned along line VIII-VIII demonstrated in FIG. 7A.

Referring now to FIGS. 7A, 7B, and 8, an additional example of the sensor and valve assembly 102 is shown. The valve assembly 102 may provide for similar operating functions and characteristics to the sensor and valve assembly 90. Accordingly, like reference numerals and terms are utilized in reference to FIGS. 7A, 7B, and 8 to discuss similar operational elements. Additionally, the discussion of the valve assembly is provided primarily in reference to the differences in the assemblies 90 and 102 for clarity. The primary difference between the valve assembly 90 and the valve assembly 102 is that the fluid sensor 22b is provided in an alternate configuration. More specifically, ultrasonic sensors 104 forming the fluid sensor 22b are positioned on one side of the central line 94. Similar to the ultrasonic sensors 100, the ultrasonic sensors 104 may each correspond to transmitter receivers (i.e., transceivers) located along a flow path 106 of the fluid provided through the central line 94.

The ultrasonic sensors 104 may be arranged perpendicular to the flow path 106 and reflect approximately 90 degrees via a plurality of reflectors 108. In this configuration, the central line 94 extending between the ultrasonic sensors 104 and the reflectors 108 may provide for a sensor pipe through which ultrasonic waves pass along a transmission path 110 with the flow of the fluid and against the flow of the fluid between the ultrasonic sensors 104 to detect the flow rate of the fluid traveling through the central line 94. As shown, the reflectors 108 may extend into the flow path 106 of the fluid in the central line 94, which may result is some turbulence in the flow of fluid through the central line 94 and may also provide for the transmission path 110 of the ultrasonic waves to travel in direct opposition to and directly along the fluid flow as denoted by the fluid path 110. In this configuration, the ultrasonic sensors 104 may provide for the fluid sensor 22b to detect and monitor the flow rate through the sensor and valve assembly 102 with improved accuracy. Accordingly, the fluid sensor 22b with the configuration of the ultrasonic sensors 104 depicted in FIGS. 7A, 7B, and 8 may provide for the detection of flow rates with an accuracy of approximately or less than 0.001 liters (L)/minute or 0.005 GPM.

As discussed previously in reference to the assembly 90, the sensor and valve assembly 102 may incorporate each of the pressure sensor 22a and the temperature sensor 22c via the first port 96a connected perpendicular to the central line 94. The valve 24 is configured to control the passage of the fluid through the central line 94 and may be configured to provide a full-bore cross-section from the central line 94 when arranged in the open position (shown in FIG. 6). As previously discussed, the valve 24 may be implemented as a ball valve in connection with the valve actuator 24a. In this configuration, a control signal from the controller of the monitoring apparatus 14 is communicated to the solenoid 24b to control the valve actuator 24a to rotate the hollow pivoting ball 24d between an open position and a closed position with only a quarter-turn of rotation, as depicted by arrow 122. Additionally, the valve 24 includes a manual actuator 24c that may similarly rotate the valve actuator 24a to control the flow rate by adjusting the orientation of the hollow pivoting ball 24d.

Figure 9:
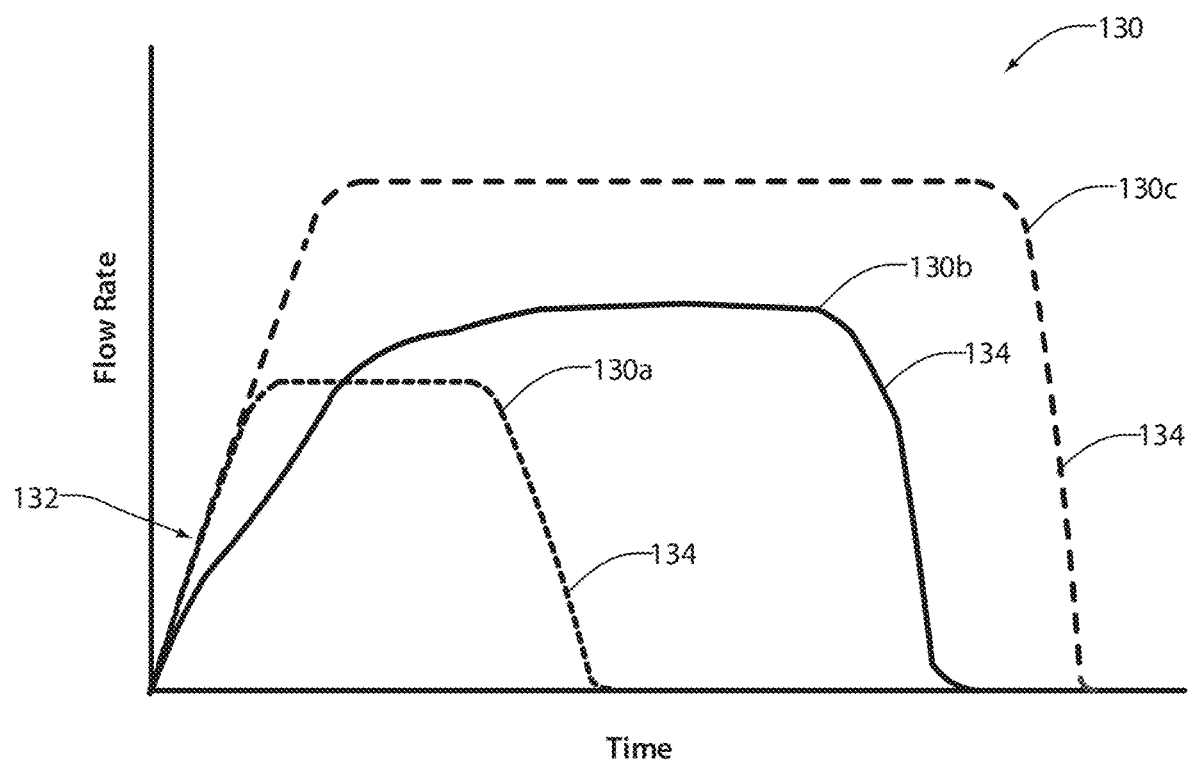
FIG. 9 is a graph demonstrating a plurality of flow rate models for various consumption implements in connection with the monitoring system.

Referring now to FIG. 9, the controller of the monitoring apparatus 14 may be configured to store and process the flow rate data communicated from the fluid sensor 22b and compare the flow rate data to preloaded flow rate profiles or consumption models in order to identify and classify the fluid consumption as being associated with one or more classifications of the consumption implements 30. As previously discussed, the monitoring apparatus 14 and, more generally, the monitoring system 10 may be configured to classify the fluid consumption of the fluid passing through the supply line 12 and attribute the consumption to various consumption implements 30 including, but not limited to, toilets 32, faucets 34, showers 36, bathtubs 38, clothes washers 40, dishwashers 42, humidifiers 44, spigots 50, irrigations systems, 52, and/or pool or hot tub supplies 54. As shown in FIG. 9, example flow rate profiles 130 are shown, including a sink faucet profile 130a, a toilet profile 130b, and a tub faucet profile 130c. As shown, the flow rate associated with each of the flow rate profiles 130 varies as well as the duration of use, an activation curve 132, and deactivation curve 134. Accordingly, the controller of the monitoring apparatus 14 may compare the flow rate identified by the fluid sensor 22b to each of the flow rate profiles 130 in order to classify the fluid consumption associated with the flow rate to each of the classifications associated with the consumption implements 30. In each of the flow rate profiles 130 demonstrated in FIG. 9, the flow rate and associated consumption occurs as a result of continuous or non-periodic use. However, the monitoring system 10 may further be able to identify the fluid consumption based on periodic or intermittent operation, which may correspond to the operation of one or more appliances (e.g., the clothes washer 40, the dishwasher 42, and the irrigation system 52) as further demonstrated in FIG. 10.

Figure 10:
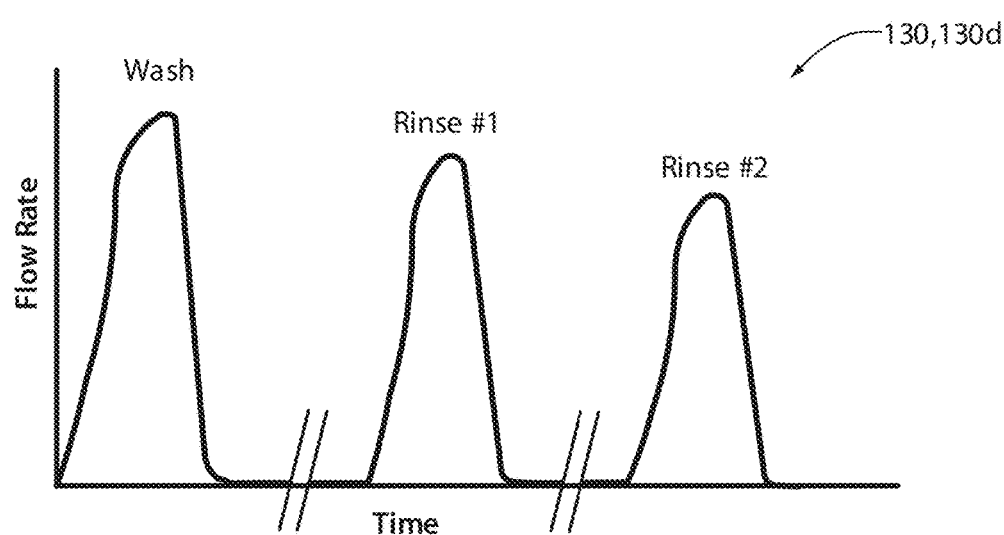
FIG. 10 demonstrates a plot of a flow rate model for an appliance in connection with the monitoring system.

As shown in FIG. 10, a clothes washer flow rate profile 130d is shown demonstrating a periodic use flow rate model. Referring now to FIGS. 9 and 10, the controller may monitor the flow rate of the fluid passing through the supply line 12 over time and categorize the fluid consumption as corresponding to one or more of the flow rate profiles 130. For example, in the event that the clothes washer 40 is operated in combination with the faucet 34 or toilet 32, the corresponding flow rate would resemble the union or additive combination of the flow rate profiles 130 demonstrated in FIGS. 9 and 10. Accordingly, the monitoring system 10 may compare the flow rates over time as detected by the fluid sensor 22b with each of the flow rate profiles 130, as well as combined flow rate models, in order to identify and associate the fluid consumption with each of the classes of the consumption implements 30.

As demonstrated in the clothes washer flow rate profile 130d, the periodic or intermittent cycles of the flow rate may further be associated with specific cycles (a wash cycle 136a, a first rinse cycle 136b, and a second rinse cycle 136c). Accordingly, the monitoring system 10 may not only be operable to categorize and classify the water consumption in relation to the consumption implements 30 but may also be to identify the usage in relation to specific events (e.g., extended water usage, different forms of periodic operation, etc.) that may also be represented in the flow rate data reported by the fluid sensor 22b. In this way, the system 10 may proficiently associate fluid consumption identified by the flow rate data in association with one or more of the consumption implements 30 alone or in combination. As later discussed in reference to FIGS. 12 and 13, the system 10 may further be operable to present the classified or categorized information identifying consumption of each of the consumption implements 30 via a user interface which may be displayed on the mobile device 20, as previously discussed.

Figure 11A:
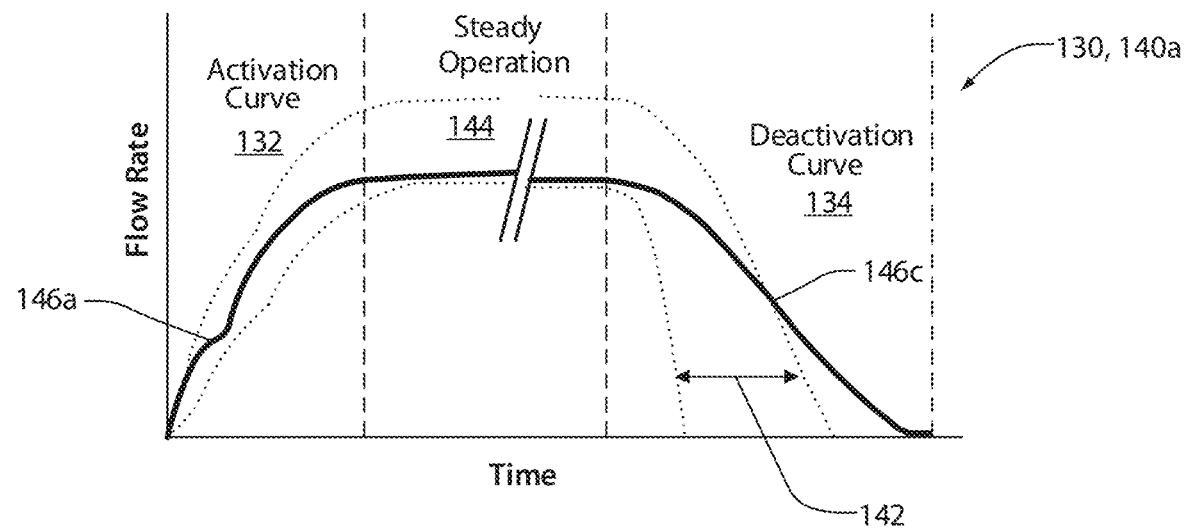
FIG. 11A demonstrates a plot of flow rate data captured over time for a first toilet as identified by a monitoring apparatus.
Figure 11B:
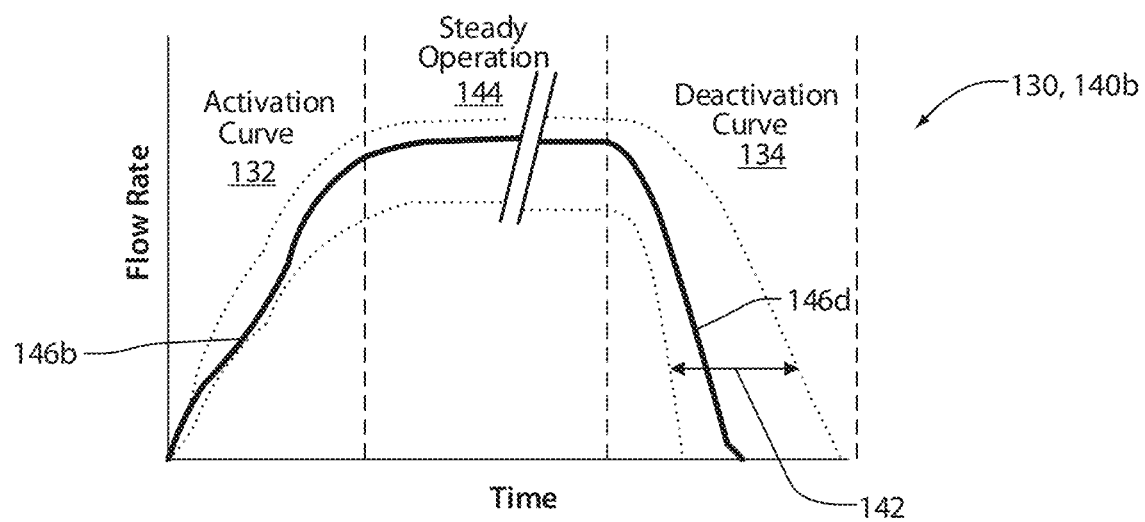
FIG. 11B demonstrates a plot of flow rate data captured over time for a second toilet as identified by a monitoring apparatus.

Referring to FIGS. 11A and 11B, first flow rate data 140*a* for the first toilet 32*a* and second flow rate data 140*b* for the second toilet 32*b* are shown, respectively. In operation, the controller of the monitoring apparatus 14 may compare the first flow rate data 140*a* and the second flow rate data 140*b* to the flow rate profiles 130 and identify that the measured flow rates fall within a range of flow rates 142 associated with the toilet flow rate profile 130*b*. In this way, the system 10 may classify the fluid consumption represented in each of the first flow rate data 140*a* and the second flow rate data 140*b* as being attributed to fluid consumption in relation to the toilets 32*a*, 32*b*. Additionally, over time, the system may adapt the preloaded flow rate or consumption models (e.g., flow rate profiles 130) and generate optimized or updated flow rate profiles for the flow rates detected in connection with the supply line 12 and the specific consumption implements 30 in connection therewith.

In general, the term optimization as discussed herein in reference to the flow rate profiles or consumption models refers to the adjustment of the numeric ranges of various flow characteristics including the flow rates, timing, rates of change of the flow rates used to identify or attribute the detected fluid flow to the classes or specific consumption implements 30 supplied by the supply line 12. That is, based on the observed behavior of flow events over time, the system 10 is configured to apply machine learning to tune and adjust the parameters, numeric models, trained models, and/or polynomial functions to which the flow event are compared to attribute the use to a class of the implements 30 and/or a specific consumption implement (e.g. the first toilet 32*a*) in a particular installation. The operation of the optimization, flow rate behavior and characteristic detection and modeling completed by the system is further discussed in reference to FIG. 18.

The updates to the preloaded flow rate or consumption profiles may be completed by a machine learning process in which the detected flow rate data 140 is loaded into an optimization algorithm wherein the coefficients of each of the flow rate profiles 130 (e.g., in this instance, the toilet flow rate profile 130*b*) are updated, such that the fluid consumption may be more accurately attributed to each of the classes of the consumption implements 30 as discussed herein. In this way, the system 10 may provide for a learning operation, termed Progressive Logic™, that allows for improved detection and classification of the fluid consumption in relation to the consumption implements 30 as the system 10 operates over time. As later discussed, the comparison and processing of the flow rate profiles to the detected flow rate data reported by the fluid sensor 22*b* may be uploaded to a central database, such that the preloaded flow rate profiles 130 may be improved and/or optimized based on data collected in each of the variety of environments wherein the monitoring apparatus 14 is installed. Though such information may be valuable to improve the operation of the system 10, such reporting may be available as an option in relation to the operation of the system 10 rather than a requirement.

Still referring to FIGS. 11A and 11B, in addition to the optimization of the flow rate profiles 130, the system 10 may be further operable to distinguish fluid consumption in relation to specific consumption implements 30. For example, over time, the system 10 may identify characteristic operation of the first flow rate data 140*a* and attribute such operation to the first toilet 32*a*. Similarly, repeated occurrences of the characteristic data represented in the second flow rate data 140*b* may be identified and attributed to a second toilet 32*b*. Distinguishing the characteristic flow rate data and corresponding fluid consumption of the first toilet 32*a* relative to the second toilet 32*b*, and/or additional toilets 32, may be processed by comparing the activation curve 132, a flow rate at steady operation 144, as well as the deactivation curve 134 represented in each instance of fluid consumption represented by the flow rate data 140. For example, when comparing the activation curves 132 of the first flow rate data 140*a* to the second flow rate data 140*b*, the slope of the activation curve 132 of the first flow rate data 140*a* may be greater than that of the second flow rate data 140*b*. Once the differing slopes are identified consistently on multiple instances in combination with the similar duration and/or activation curves 132, the system 10 may distinguish the operation and usage of the first toilet 32*a* from that of the second toilet 32*b*.

Each of the activation curves may have different characteristic curves or portions. For example, a first characteristic activation curve 146*a* and a second characteristic activation curve 146*b* are representative of the flow rate occurring in response to the activation of flow valve of each of the first toilet 32*a* and the second toilet 32*b*, respectively. Additionally, the controller of the system 10 may distinguish the operation of the first toilet 32*a* from the second toilet 32*b* based on the flow rate that occurs during the steady operation 144. As shown, the second flow rate data 140*b* indicates a higher relative flow rate at steady operation 144 relative to the first flow rate data 140*a*. Such differences may be attributed to differences in the valve of each of the respective toilets 32*a*, 32*b* and may also be attributed to the elevation or floor on which the toilets 32*a*, 32*b* are positioned relative to their supply lines 12. Finally, the controller may also compare the deactivation curves 134 identified in the first and second flow rate data 140*a*, 140*b*, respectively. As shown, the first flow rate data 140*a* demonstrates a third characteristic curve 146*c* that has a deactivation slope that is less than a fourth characteristic curve 146*d* of the second flow rate data 140*b*.

Accordingly, the controller of the monitoring apparatus 14 may store the representative information and group occurrences of similar flow rate data 140 over time in order to distinguish the characteristic operation of each of the consumption implements 30 and thereby classify the fluid consumption based on the characteristic flow rate profiles or models generated based on the flow rate data reported by the fluid sensor 22*b* over time. In this way, the system 10 may provide for the classification of the fluid consumption of specific consumption implements 30 connected to the supply line 12 without directly monitoring the fluid delivered to the consumption implements 30. As previously discussed in reference to FIG. 2, in order to improve the identifying capability and accuracy of the detection of the characteristic curves 146 and corresponding classification in relation to the consumption implements 30, multiple monitoring apparatuses 14 may be connected to different portions of the supply line 12 and/or may be separately connected to the cold water supply 62*a* and the hot water supply 62*b*.

Figure 12B:
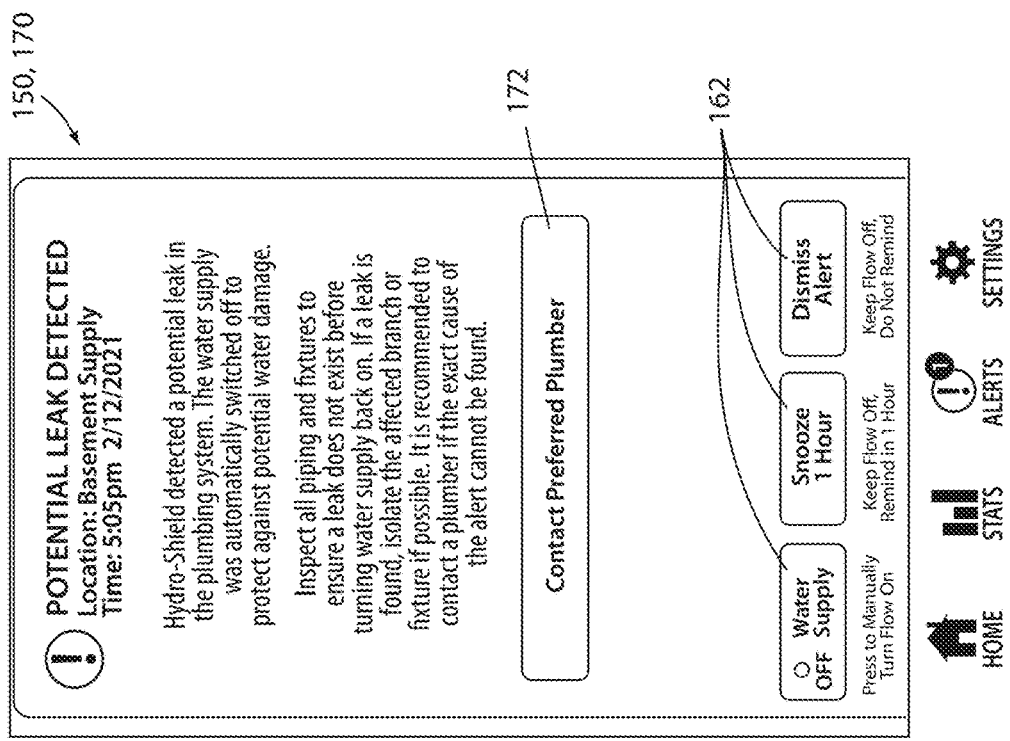
FIG. 12B is graphical representation demonstrating a user interface for a water monitoring system.
Figure 12A:
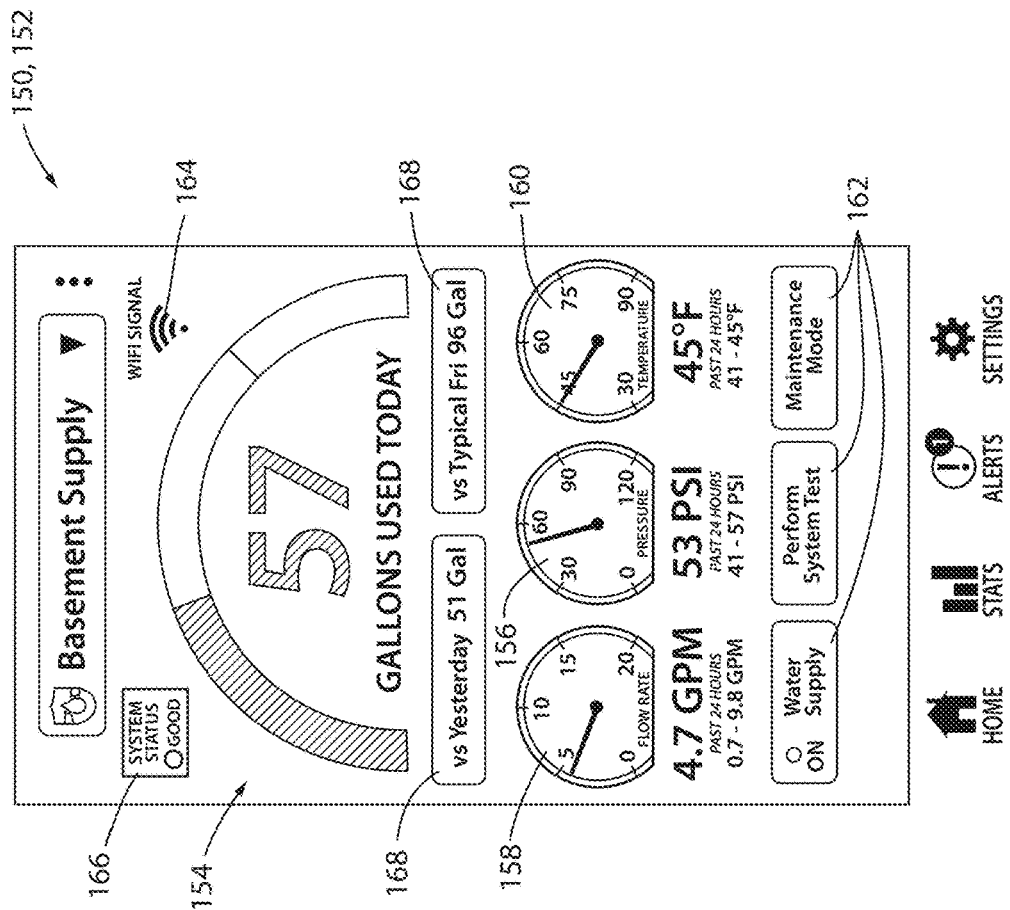
FIG. 12A is graphical representation demonstrating a user interface for a water monitoring system.

Referring now to FIGS. 12A, 12B, 13A, and 13B, exemplary representations of a user interface 150 of the monitoring system 10 are shown demonstrating various operations of the system 10. Referring first to FIG. 12A, a system status screen 152 may identify a summary of the fluid consumption 154 as well as indications of a measured pressure 156, a measured flow rate 158, and a measured temperature 160. The user interface 150 may also provide a plurality of control options 162, which may allow the user 26 to control the valve 24 to activate or deactivate the water supply, perform a system test, and/or adjust a mode of operation of the system 10. The user interface 150 may further depict a wireless status 164 identifying a signal strength and connection integrity of the device network 16 and a system status 166 identifying the health of the monitoring system 10 and the fluid or fluid flow in the supply line 12. In addition to identifying the fluid consumption 154, the user interface 150 may also compare the current use in relation to historic use and display a historic use comparison 168 on the user interface 150 as well. Accordingly, the system 10 may provide a dashboard that reports various indicators identifying the operation of the monitoring system 10 as well as the status of each of the attributes of the fluid detected by the sensors 22.

In certain circumstances, the monitoring system 10 may report and control the user interface 150 to display a potential leak warning 170. As depicted in FIG. 12B, the potential leak warning 170 provides information to the user 26 via the user interface 150, which may be displayed on the mobile device 20, such that the user may activate one or more of the control options 162. As shown, the control options 162 in FIG. 12B include a selection to deactivate the water supply, delay the notification for a predetermined period, or dismiss the leak detection notification entirely. Additionally, in some cases, the user interface 150 may provide an automated connection input 172 that may control the mobile device 20 to dial a phone number or otherwise communicate with a preferred or predetermined plumber or service technician. In this way, the monitoring system 10 may provide for convenient control and access to professional assistance in the event of a leak detection as represented by the potential leak warning 170.

Figures 13A, 13B:
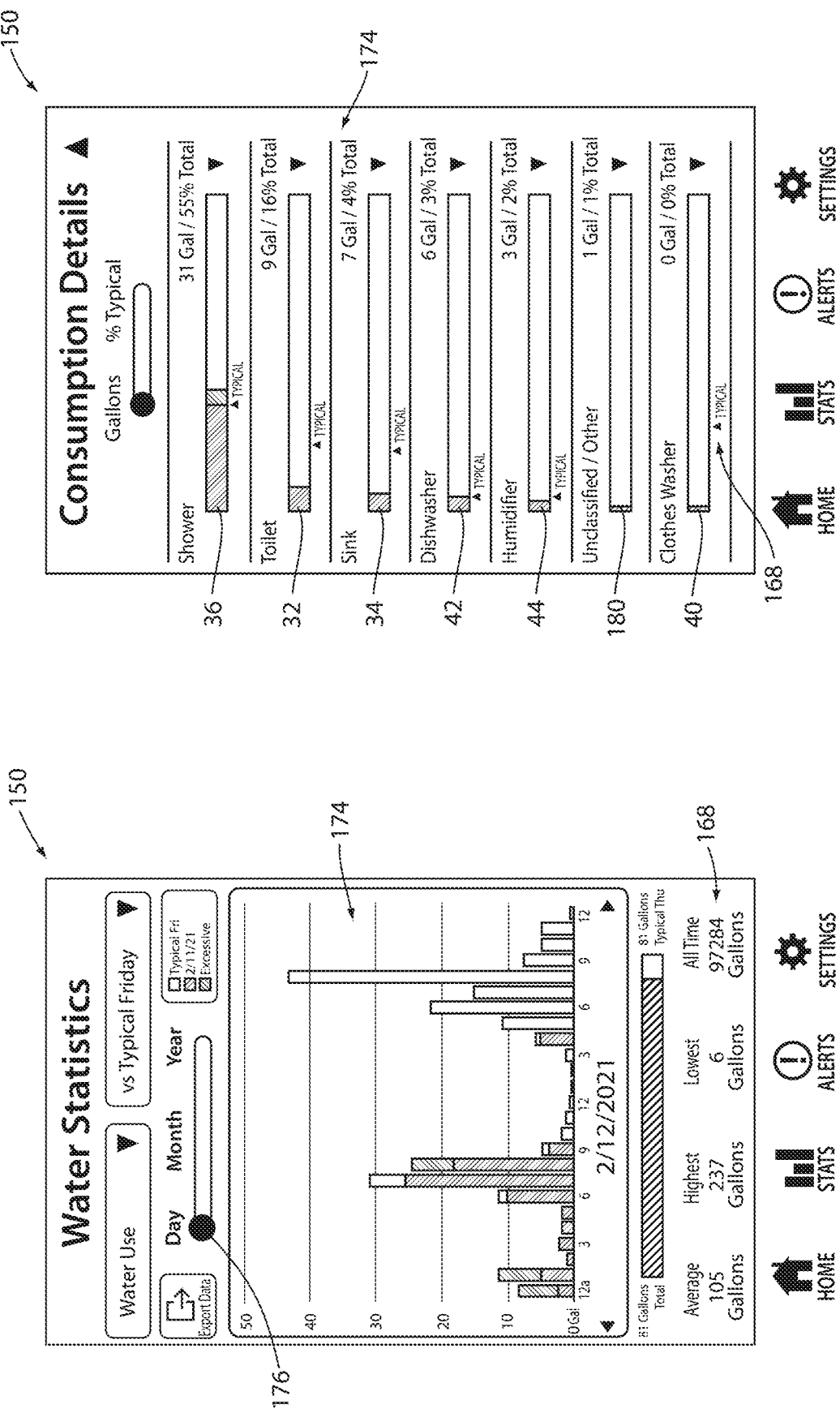
FIG. 13A is graphical representation demonstrating a user interface for a water monitoring system.
FIG. 13B is graphical representation demonstrating a user interface for a water monitoring system.

FIG. 13A demonstrates a graphical depiction 174 of the fluid consumption 154 over time for a specific day. Additionally, the user interface 150 may provide for a timeline selection input 176 that may allow the user 26 to toggle the display of the fluid consumption 154 to represent a day, a month, a year, or other custom time periods that may be of interest to the user 26. The graphical depiction 174 may demonstrate the use over a specific timeframe relative to an average use and/or a recent use, such as a day-to-day use comparison, a month-to-month comparison, or an annual comparison. FIG. 13B demonstrates consumption details for each of the categories or classes of the consumption implements 30 as previously discussed. In order to assign the fluid usage to the use categories, the controller may compare the flow rates detected by the fluid sensors 22 for each flow event detected by the monitoring apparatus 14 to the consumption models or characteristic flow profiles as discussed herein. Based on the comparison, the controller of the system 10 may categorize the fluid consumption accordingly as depicted in FIG. 13B.

FIG. 13B demonstrates the consumption details for the shower 36, toilet 32, sink faucet 34, dishwasher 42, humidifier 44, and clothes washer 40, as well as additional unclassified activity 180. In addition to demonstrating a volume or percentage of the consumption attributed to each of the consumption implements 30, the user interface 150 may further demonstrate a comparison of the consumption for each of the classes associated with the consumption implements 30 in relation to a historic level of consumption. As previously discussed, historic data may be maintained by the system 10 in a memory or database for extended periods (e.g., multiple years), such that the system 10 may provide meaningful feedback that does not only apply to day-to-day usage but may also account for seasonal and annual/seasonal variations in fluid consumption. Accordingly, the system 10 may provide for a variety of beneficial information to track the water consumption in relation to each of the classes as well as specific consumption implements 30 and may also provide feedback in relation to seasonal or annual variations that may impact the consumption and corresponding analysis.

Figure 14A:
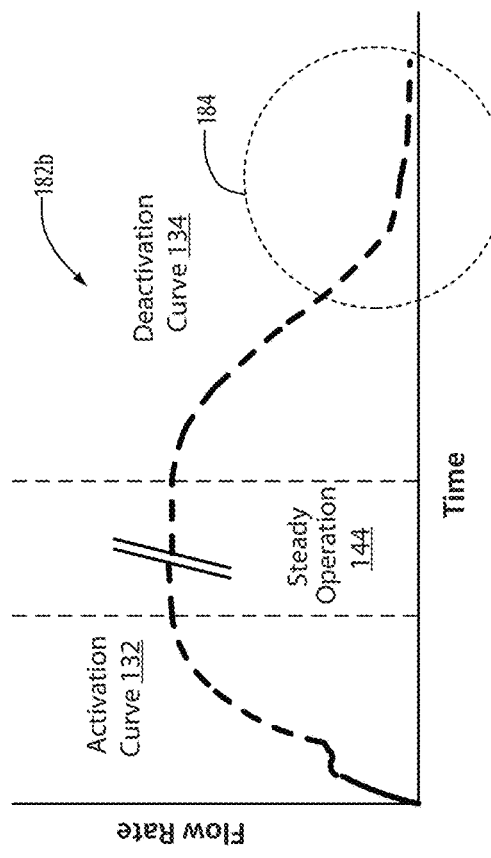
FIG. 14A is a plot demonstrating flow rate data captured over time for a consumption implement detected by a monitoring apparatus.
Figure 14B:
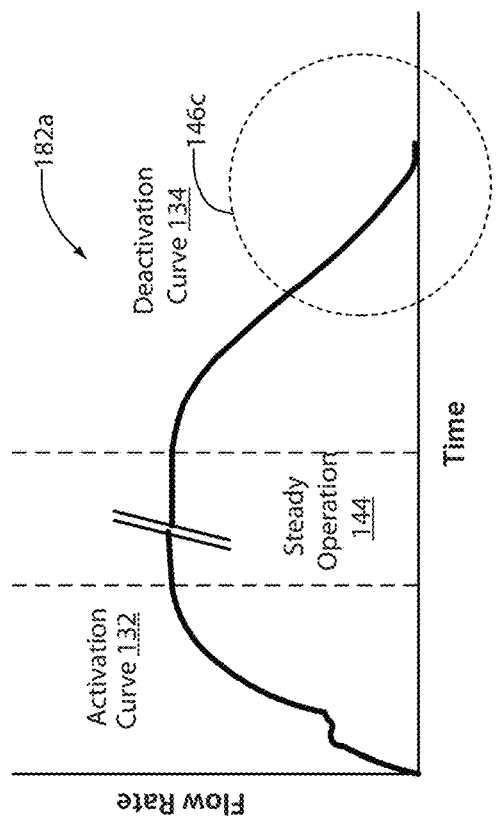
FIG. 14B is a plot demonstrating flow rate data captured over time for a consumption implement detected by a monitoring apparatus.
Figure 14C:
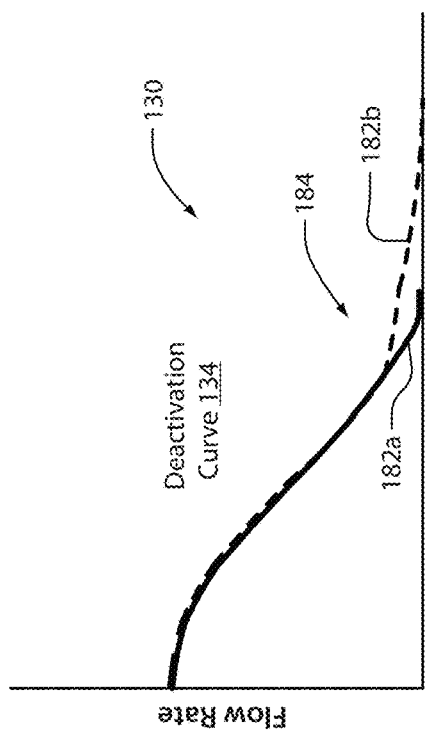
FIG. 14C is a plot demonstrating a comparison of the flow rate data demonstrated in FIGS. 14A and 14B.

Referring now to FIGS. 14A, 14B, 14C; flow rate data 182 from a consumption implement 30 (e.g. a toilet) is shown recorded from a first time, which is referred to as first data 182a, and a second, later time, which is referred to as second data 182b. As demonstrated in FIGS. 14A and 14B, the flow rate data over the activation curve 132 and the steady operation of the consumption implement 30 depicted in FIGS. 14A and 14B is similar. However, during the deactivation curve 134, a shut-off period 184 of the flow rate data 182 differs between the first data 182a and the second data 182b. The differences in the flow rate data over the shut-off period 184 for the first data 182a and the second data 182b may be the result of wear in one or more components of the corresponding consumption implement 30 (see e.g., the toilets). For example, over time, sediments may build up in a tank of the toilet, which may result in change in the operation of a flow valve and plunger of the toilet. Such changes, as affected by the wear of the components, may result in leakage from the tank and/or unsteady operation of the flow valve, which may result in the changes from the first data 182a to the second data 182b occurring over an extended time period (see e.g., six months to one year). In order to continue to accurately attribute the first data 182a and the second data 182b to the same consumption implement 30, the controller of the monitoring apparatus 14 may update and optimize the flow rate profile for the consumption implement 30 based on small incremental changes identified over time. As previously discussed in reference to FIGS. 11A and 11B, a learning operation termed Progressive Logic™ may be applied to update the device specific or characteristic flow profiles to which the flow rate data is compared in order to improve the identification and attribution of the fluid consumption as corresponding to the activation of one or more specific consumption implements 30 as discussed herein.

As depicted in FIG. 14C, the first data 182a and the second data 182b is shown plotted together over the shut-off period 184 for comparison. In order to ensure that the fluid consumption is attributed to the specific consumption implement 30 (discussed in reference to the first toilet 32a in this example), the controller may first classify the flow rate data based on the characteristic flow profile or model generated over time for the specific consumption implement 30. Once the flow rate data is classified or identified as being attributed to the specific consumption implement 30, the controller may further update the characteristic flow rate profile based on changes in the flow rate that may gradually occur over time. Such changes eventually may result in the differences shown between the first data 182a and the second data 182b. The controller may achieve this process by tuning the characteristic flow rate profiles via the machine learning or Progressive Logic™ procedures, such that variations in the operation of each of the consumption implements 30 may be tracked and utilized to modify the characteristic models used by the system 10. In this way, the system 10 may monitor the flow rate data and utilize the data attributed to the specific consumption implement (e.g., the first toilet 32a) to incrementally update and optimize the characteristic flow model over time.

Figure 15:
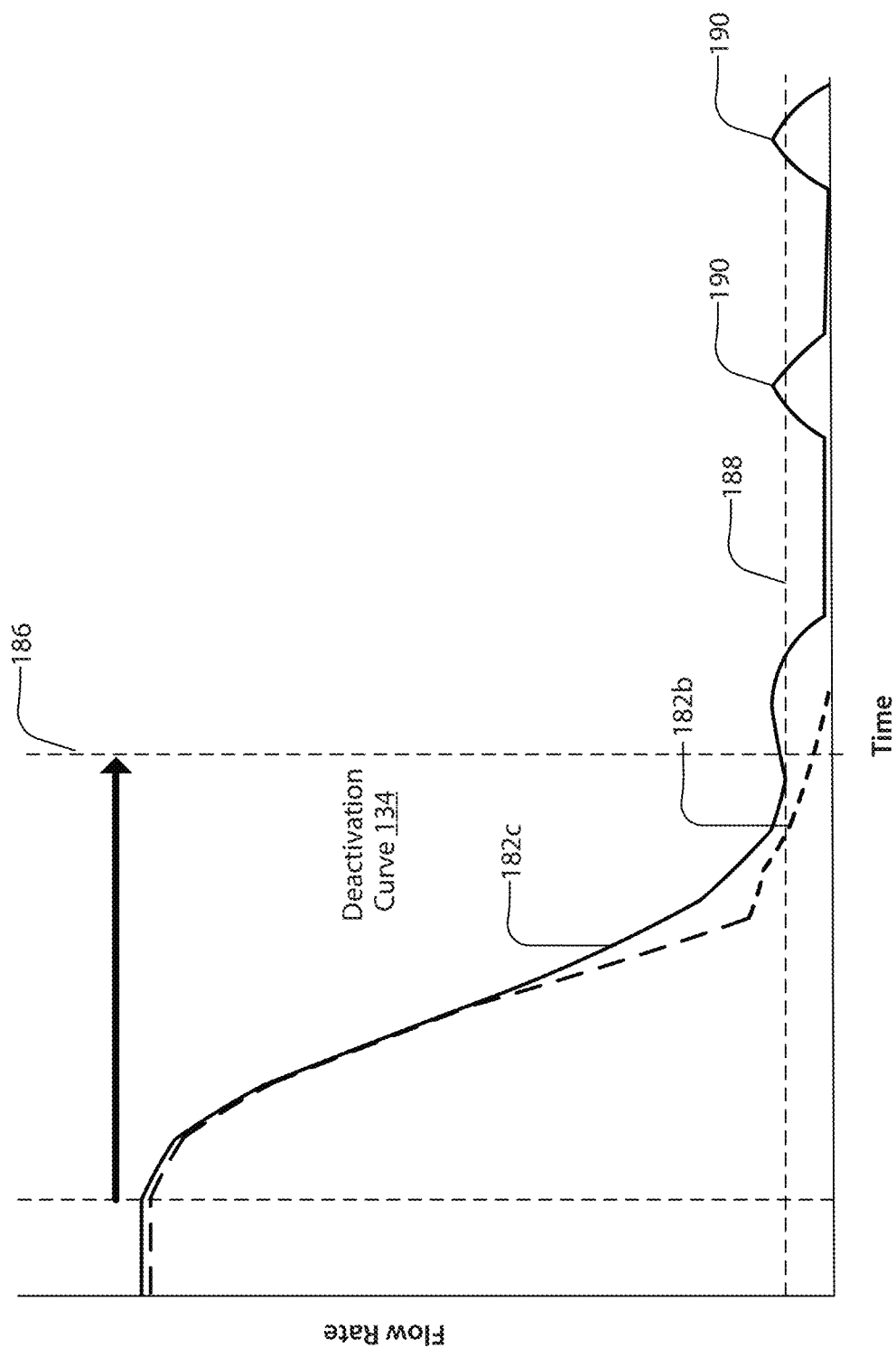
FIG. 15 is a plot demonstrating a deactivation curve for flow rate data captured over time for a consumption implement detected by a monitoring apparatus.

Referring now to FIG. 15, the flow rate data 182 for the specific consumption implement 30 as discussed in reference to FIGS. 14A, 14B, and 14C is shown at a third time period as third data 182c. The third data 182c may correspond to a time period following the second time period, wherein the flow rate of the consumption implement 30 is demonstrating signs of leakage. For comparison, the second data 182b is demonstrated in combination with the third data 182c focusing on the shut-off period 184.

Though the system 10 may update the characteristic models or flow rate profiles utilized to attribute the fluid consumption to each of the consumption implements 30, limits may be applied to a time period over which the flow rate is consistently identified and/or based on a total volume of fluid attributed to a single or contiguous flow rate event. As shown in FIG. 15, the controller may compare the flow rate for a particular classification of consumption or in relation to a previously identified characteristic flow rate attributed to the specific consumption implement 30 to a time limit 186. For example, the time limit 186 may be designated by the system 10 to identify a flow event exceeding a normal operating time for operation or, more specifically, in relation to a deactivation curve 134. As an example, in response to identifying that the flow rate is decreasing or following an inflection point of the flow rate data, the system 10 may start a timer and continue to allow the timer to accumulate until the flow rate decreases below a leak threshold 188. If the flow rate does not subside below the leak threshold 188 prior to the timer exceeding the time limit 186, the system 10 may identify that the operation of the consumption implement 30, in this example the specific toilet in connection with the supply line 12, is leaking and output a warning identification. In this way, the system 10 may be configured to attribute a leak condition to a specific consumption implement 30 and alert a user of the system 10 by communicating the potential leak warning 170 as previously discussed herein.

Following a consumption or flow event, as exemplified by the third data 182c, the controller of the system 10 may continue to monitor the flow rate and attribute nonconforming flow rate activity 190 to one or more consumption implements 30 with activity identified preceding the nonconforming flow rate activity 190. The nonconforming flow rate activity 190 may correspond to flow rate activity that cannot be attributed by the system 10 to a predefined consumption model for a class of consumption or a characteristic flow rate profile for one of the specific consumption implements 30. Accordingly, as a result of the nonconforming flow rate activity 190 detected by the monitoring apparatus 14, the controller of the system 10 may output the potential leak warning 170 and identify the leak warning in reference to the consumption implements that were operating over a period of time preceding the detection of the nonconforming flow rate activity 190. In the specific example described herein, the nonconforming flow rate activity 190 may be identified in a message accompanying the potential leak warning 170 indicating that the leak may be attributed to the specific toilet to which the most recent consumption of the fluid from the supply line 12 was attributed by the system 10. In this way, the system 10 may not only be operable to detect leak conditions but may also provide information to assist in identifying a cause and specific consumption implement 30 that may be attributed to the leak condition.

Figure 16:
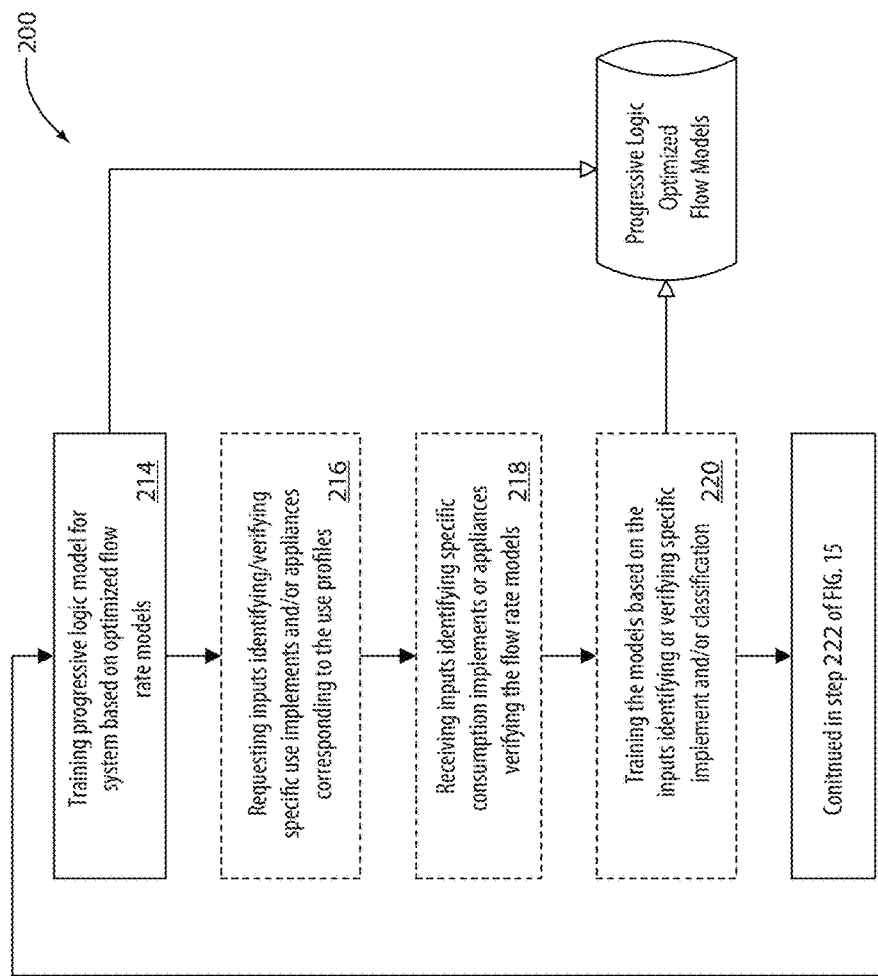
FIG. 16 is a flow chart demonstrating a method of classifying and optimizing a classification of fluid consumption for a monitoring system.
Figure 16:
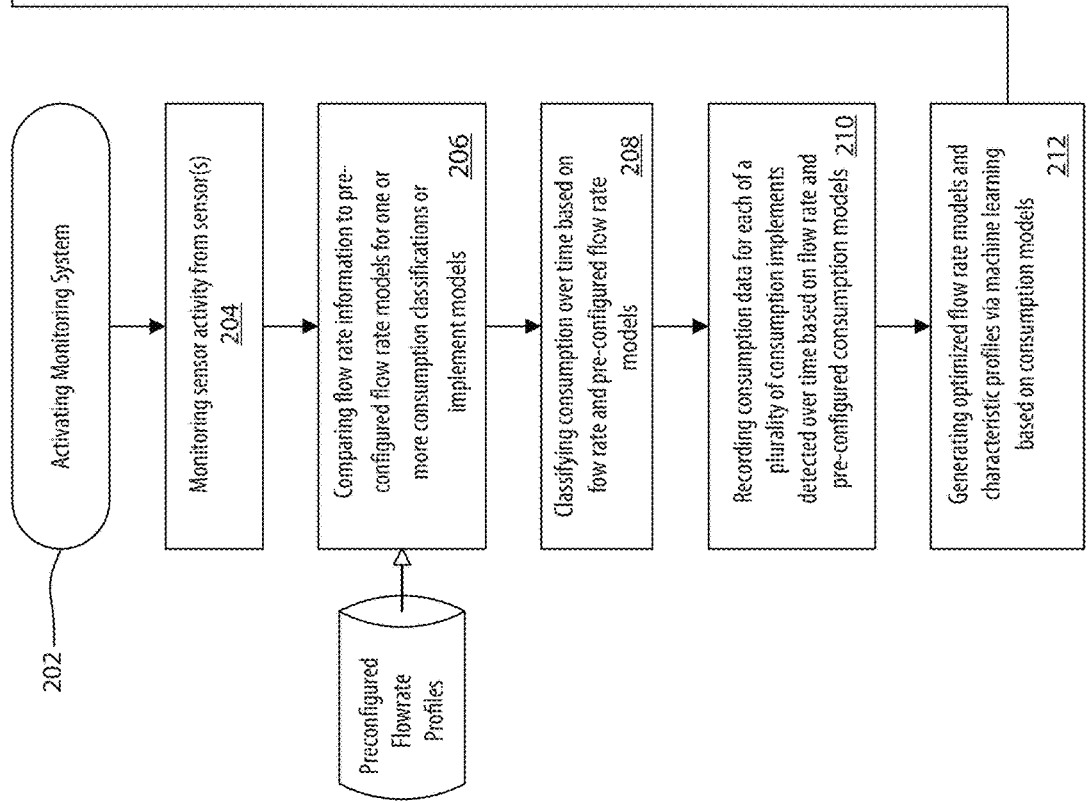

Referring now to FIG. 16, a flow chart of a method 200 for operating the system 10 is shown. The method 200 may begin in step 202 in response to an activation of the monitoring system 10. Following activation, the controller of the monitoring apparatus 14 may monitor sensor activity from the sensors 22 (204). The controller may then compare flow rate information reported by the fluid sensor 22b to preconfigured flow rate profiles for one or more classifications of use (206). As previously discussed, the comparison of the flow rate information to the preconfigured flow rate profiles may initially be applied by the system 10 to attribute the fluid consumption to the different categories of consumption implements 30 (e.g., the toilet 32, the faucet 34, the shower 36, etc.) as discussed herein. Accordingly, in step 208, the method 200 may continue to classify the consumption of the fluid passing through the supply line 12 over time to attribute the consumption to each of the corresponding classes of the preconfigured flow rate profiles based on the comparison in step 206.

Over time, the method 200 may continue to record consumption data and begin to distinguish the characteristic flow rates of each of the consumption implements 30 in connection with supply line 12 (210). Based on the consumption data recorded over time, the method 200 may apply machine learning or Progressive Logic™ to generate updated use profiles or flow rate profiles 130, thereby optimizing the preconfigured flow rate profiles to more accurately attribute the flow rate events and corresponding consumption to the categories of consumption for each of the consumption implements 30 in connection with the supply line 12 (212). As previously discussed in reference to FIGS. 11A and 11B, the machine learning operation may process the historic flow rate data and utilize the detection and classification of the characteristic curves 146 to not only classify the consumption in relation to the types of consumption implements 30 but may also identify the characteristic operation of the flow rate data and attribute the operation to specific consumption implements 30. Accordingly, in step 214, the method 200 may continue by training the consumption models via the Progressive Logic™ operation to optimize the flow rate profiles over time. In this way, the system 10 may apply machine learning to the flow rate profiles to improve the classification of the consumption and, more specifically, the identification of the consumption in relation to specific consumption implements over time. Such training may be completed passively in the background without requiring any input from the user of the system 10.

Though in some cases the system 10 may not require user feedback, in step 216, the method 200 may optionally request inputs identifying or verifying classifications or identification of flow rate events in relation to specific consumption implements 30. Accordingly, in step 218, the method 200 selectively receives input identifying a specific consumption implement or a classification of the consumption implement 30 that was recently utilized. In this way, the controller of the system 10 may receive a verification or identification indicating the consumption implement or consumption classification to which the recent fluid consumption is attributed. As discussed herein, the nature of the timing during which the user feedback is requested may assist the user 26 in recalling the consumption implement 30 utilized for a given flow event. In some instances, the system 10 may record flow events and request the user feedback for multiple flow events which may be accompanied by time stamps indicating the time that the flow events occurred. In either case, based on the input from step 218, the method 200 may continue by training or optimizing the flow rate profiles in response to the inputs received (220). Following step 220, the method 200 continues in step 222 in FIG. 17.

Figure 17:
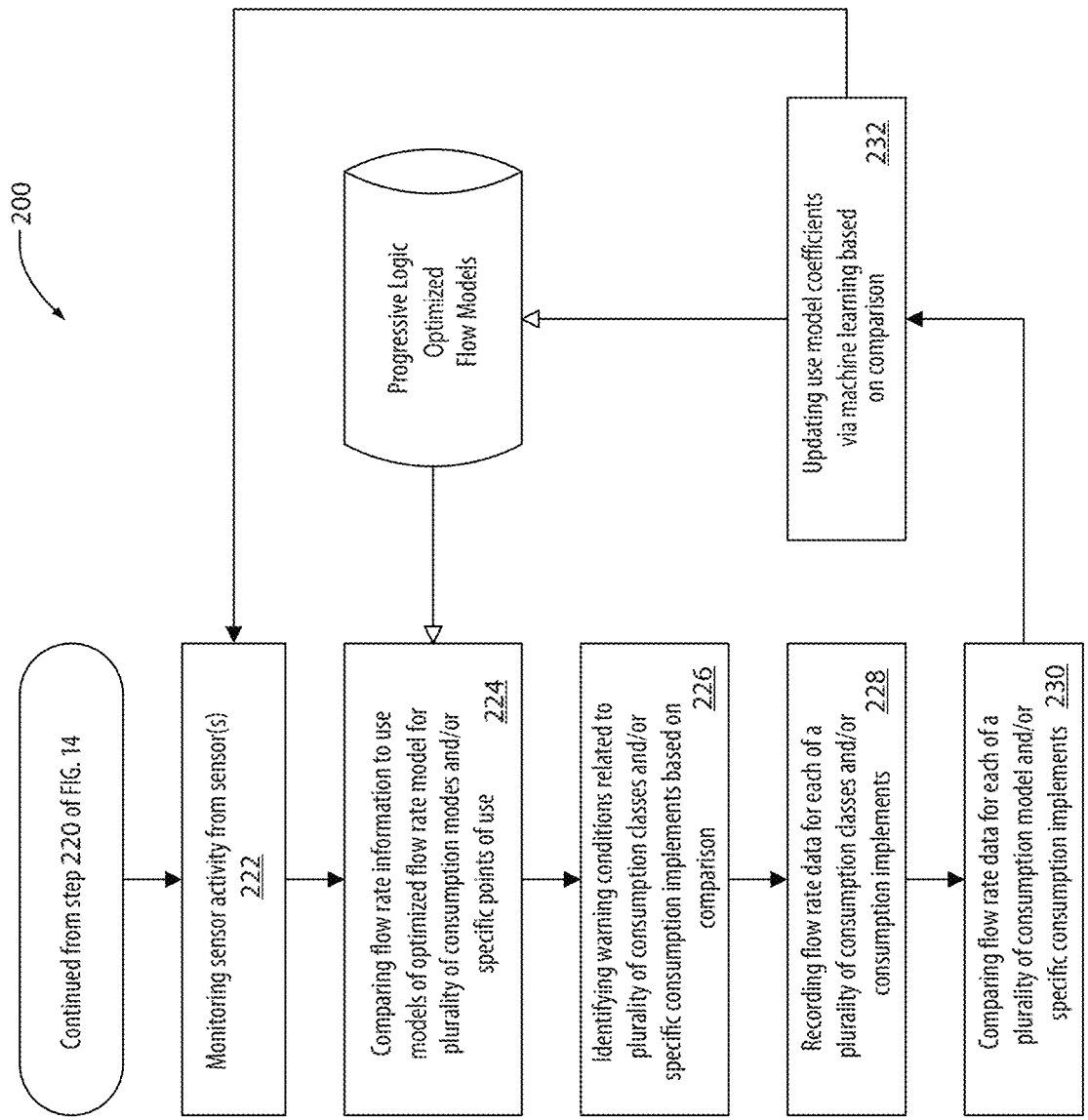
FIG. 17 is a flow chart continuing the method introduced in FIG. 16.

Referring now to FIG. 17, the method 200 is continued from step 220 of FIG. 16. The steps of the method 200 demonstrated in FIG. 17 may in some cases correspond to recursive steps similar to those discussed in reference to FIG. 16. The steps of method 200 discussed in reference to FIG. 17 may further define or clarify how the system 10 operates to improve the consumption profiles and further distinguish the characteristic operation of the consumption implements 30. Accordingly, in step 222, the method 200 may continue by monitoring the sensor data communicated and detected by the sensors 22. The flow rate information identified by the sensors 22 is then compared to the data profiles or algorithms characterizing the optimized consumption models for the classes or characteristic profiles of the specific consumption implements 30 (224). Based on the comparison, the system 10 may further identify leak or warning conditions that may be identified based on the flow rate profiles or characteristic flow rate models for the consumption implements 30 as discussed in reference to FIG. 15 (226). The method 200 may further continue by recording flow rate data for each of the consumption classes and/or specific consumption implements 30 (228). Incrementally over time, the system 10 may compare the flow rate data to the optimized consumption models and/or characteristic flow rate profiles of the specific consumption implements 30 to detect variations and differences in the flow rate data (230). Based on the differences identified, the method 200 may update the consumption models and characteristic flow rate profiles to optimize and improve the accuracy of the detection classification via the Progressive Logic™ operation over time (232). Following step 232, the method 200 may return to step 222 and continue monitoring the sensor data reported by the sensors 22.

Figure 18:
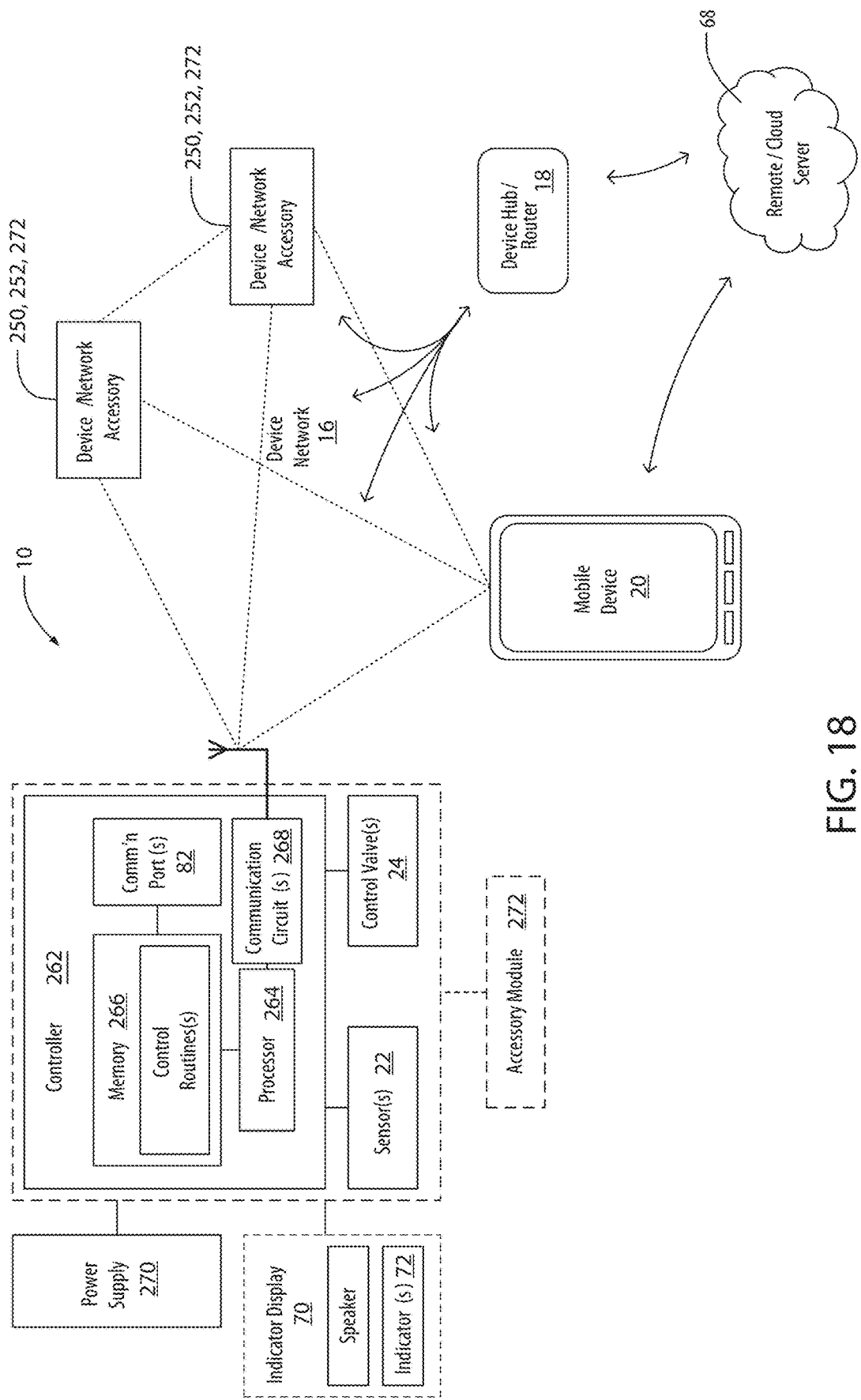
FIG. 18 is a symbolic block diagram demonstrating a monitoring system comprising a monitoring and control apparatus in accordance with the disclosure.

Referring to FIG. 18, a block diagram of the monitoring apparatus 14, or more generally the monitoring system 10, is shown incorporated as a node of a device network 16. As shown the device network 16 may include a variety of electronic devices, which may be configured to communicate over various wired or wireless communication protocols. In the example shown, the monitoring apparatus 14 is accompanied by a plurality of wireless or network accessories 250 (e.g., smart home devices, home security systems, etc.) and in communication with the mobile device 20 via the device network 16. The device network 16 may be implemented as a mesh or internet of things (IoT) network, wherein each of a plurality of connected devices 252 (e.g., the monitoring apparatus 14, the network accessories 250, the mobile device 20, etc.) is operable to communicate directly with one another via the device network 16. Additionally, the device network 16 may utilize a device hub 18 or router through which the connected devices may be in communication with one another as well as a remote server 68. The device hub 18 may correspond to a smart device hub, a wireless router, and/or a wired communication network. Accordingly, the device network 16 permits coordinated control and programming of each of the connected devices 252 via a hierarchical control structure and/or via a distributed control structure.

The monitoring apparatus 14 provides for programmable operation via a controller 262 configured to control various components and/or integrated circuits to provide for the control of the valve 24 in response to the sensors 22. Additionally, the operation provides for operation based on controls communicated via the user interface 150 of the mobile device 20. The controller 262 may include various types of control circuitry, digital and/or analog, and may include a processor 264, microcontroller, application-specific integrated circuit (ASIC), or other circuitry configured to perform various input/output, control, analysis, and other functions as described herein. The controller 262 further includes a memory 266 configured to store one or more routines as discussed herein. The memory 266 may be implemented by a variety of volatile and non-volatile memory formats. One or more communication circuits 268 of the monitoring apparatus 14 may be incorporated with the controller 262 or in communication with the controller 262 to permit communication via the device network 16 or various protocols of wireless or wired network communication.

The controller 262 of the monitoring system 10 receives power from a power supply 270, which may further be configured to supply power to the sensors 22, the valve 24, and the indicator display 70. The power supply 270 may include one or more transformers, rectifiers, capacitors, and various electrical components to condition the power for the operation of the monitoring apparatus 14. In addition to the sensors 22 and the valve 24, the monitoring apparatus 14 may further comprise one or more accessory module(s) 272. The accessory modules may include a variety of devices, which may be controlled by instructions communicated from the controller 262 via the communication circuit 268. In some implementations, the accessory module(s) 272 may correspond to one or more remote sensors, valves, user interfaces, etc. in communication with the controller 262 via the communication circuit 268. In such implementations, the controller 262 may operate as the central controller 66 as previously discussed in reference to FIG. 2. Accordingly, the controller 262 may be configured to receive sensor information from remote sensors or accessory modules 272 identifying sensor data (e.g., flow rate, pressure, temperature, etc.) for various supply lines distributed throughout the building 48. The sensor data from the remote sensors or accessory modules 272 may be communicated to the controller 262 (e.g., the central controller 66). Based on the sensor data, the controller 262 may communicate instructions to each of the accessory modules 272 via the device network 16. For example, the controller 262 may communicate instructions to a plurality of valves to achieve zone control or more generally, coordinated control of the connected devices 252. The accessory module(s) 272 may include one or more pumps (e.g. sump pumps, well pumps, etc.), valves, sensors, actuators, and a variety of other accessories. Accordingly, the disclosure provides for a scalable and flexible system that may be utilized to monitor and control the delivery and drainage of the fluid supplied to and expelled from the building 48, multiple buildings, and/or a complex of buildings or structures.

In general, the term optimization as discussed herein in reference to the flow rate profiles or consumption models refers to the adjustment of the numeric ranges of various flow characteristics including the flow rates, timing, and rates of change of the flow rates used to identify or attribute the detected fluid flow to the classes or specific consumption implements 30 supplied by the supply line 12. That is, based on the observed behavior of flow events over time, the system 10 is configured to apply machine learning to tune and adjust the parameters, numeric models, trained models, and/or polynomial functions to which the flow events are compared to attribute the use to a class of the implements 30 and/or a specific consumption implement (e.g. the first toilet 32*a*) in a particular installation. Once the system 10 has operated for a time sufficient to have had each of the consumption implements operated a predetermined number of times (e.g. one week, one month, etc.), the system 10 may narrow the ranges or parameters to which each of the flow event is compared based on the historic flow rate operation detected for the system 10. The predetermined number of uses or documented instances of use of the consumption implements 30 may vary based on the frequency of use of each of the consumption implements 30. The number of uses may also be determined based on a repeatability of the documented similar flow rate characteristics and their statistical variation. Accordingly, the system 10 may determine optimized flow rate profiles for each of the different classes or specific consumption implements 30 over differing time periods due to some variances in the operation requiring data to statistically resolve the range of flow rate characteristic to associate with each of the classes or consumption implements 30.

As the parameters are narrowed over time, the system 10 may gradually generate the characteristic flow rate profiles of flow events that are repeatable and limited in variation from one occurrence to the next. In this way, the system 10 may modify the detection parameters over time by supplying the recorded flow rate data associated with a particular installation of the system 10 into a machine learning or Progressive Logic™ algorithm. As such, the system may begin with pre-loaded flow rate profiles for the classes of consumption implements 30 and narrow, tune, or optimize the parameters or ranges of the flow rate profiles to more narrowly correspond to and conform to the characteristic flow rate characteristics identified for consumption implements 30 supply by the supply line 12.

In addition to optimizing the flow rate profiles, the system 10 may further distinguish the characteristic flow rate profiles of one or more of the consumption implements 30 by statistically grouping like occurrences of flow rate activity. For example, once a characteristic flow event with similar duration, flow rate, rate of change of flow rate and/or other identifiable attributes is identified to have occurred a predetermined number of times (e.g. 5, 10 times), the system 10 may generate a new classification for the flow rate for the specific consumption implement 30. Once generated, the flow events detected by the system 10 may be compared to the optimized flow rate profiles as well as the characteristic profiles for one or more of the consumption implements 30. In this way, the system 10 may attribute the flow events to the classes or specific consumption implements identified in connection with the system 10 over time.

Additionally, the system 10 may remove or disable one or more flow rate profiles associated with one or more classes of the consumption implements 30 based on a lack of recorded activity. For example, as the system 10 becomes optimized for a particular installation, the controller 262 may establish a limited range of classes, specific implements, and corresponding flow rate behavior to expect from normal operation of the supply line 12. Accordingly, if a flow event is detected by the system 10 that is generally considered normal or within the pre-configured characteristics of the preloaded flow rate profiles but outside the optimized flow rate profiles, the system 10 may trigger a leak warning and control the valve 24 to close. Additionally, the system 10 may request an input from the user 26 via the mobile device 20 indicating if a consumption implement has been added in connection with the supply line 12. In this way, the system 10 may improve the leak detection performance and attribution of the flow events detected over time by optimizing the flow rate profiles or consumption models to which the flow events are compared over time. This operation is referred to by the manufacturer as Progressive Logic™.

Though effective in optimizing the attribution of flow rate events based on the data in connection with a single supply line 12, the system 10 may further implement region information reported to the remote server 68 by additional installations of the monitoring and control system 10 in connection with other fluid supply lines 12 Such reporting may be supplied from other installations of compatible systems in buildings or homes in the same or similar geographic regions. For example, fluctuations in the operation the systems 10 operating in a predetermined geographic range (e.g. 20 miles, 50 miles, 100 miles) may be attributed to local weather conditions (e.g. drought and increased irrigation) rather than leakage events. More specifically, as a result of such reporting among multiple systems 10 identified to have irrigation systems 52, the remote server 68 may communicate to each of the controllers 262 or systems 10 to update the flow rate profile of irrigation systems 52 to allow for increased run time without activating a leak alarm. In this way, the system 10 may optimize the detection of leaks based on regional flow rate information identified in the associated or predetermined geographic ranges or regions.

In addition to geographic reporting, the system 10 may document historic operating fluctuations to similarly adjust the flow rate profiles for leak detection. For example, the system 10 may be configured to identify seasonal variations in flow rate over time and attribute the variations to seasonal fluctuations. As discussed previously, the system 10 may utilize regional flow rate information to update the flow rate profiles but may also utilize historic information recorded for the specific installation in the building 48. For example, if the flow rate is determined to increase two consecutive years in the late spring or summer, the system 10 may attribute the increase to the activation of the irrigation system 52 or the filling of a pool. Similarly, the system 10 may anticipate decreases or complete stoppages of use, which may be attributed to seasonal occupancy of the building 52. If such a condition is identified, the system 10 may activate an away mode that may trigger a leak alert based on a limited flow event (e.g. a flow event in excess of a minimum away flow rate detection based on amplitude or duration of fluid flow). Additionally, if the fluid consumption diminishes during a historic period of non-occupancy (e.g. during previously documented travel months) or upon a significant decrease in fluid consumption exceeding a predetermined occupancy usage per day or per month, the system 10 may communicate a notification to the mobile device 20 and request whether the user 26 wishes to close the valve 24 as a leak prevention precaution. Accordingly, the system 10 may be configured to provide for optimized operation based on historic usage, regional usage, or a variety of flow rate information documented over time.

Still referring to FIG. 18, the device network 16 may be implemented via one or more direct or indirect, non-hierarchical communication protocols, including but not limited to Bluetooth®, Bluetooth® low energy (BLE), Thread®, Z-Wave®, ZigBee®, etc. In this configuration, the connected devices 250, 252, 272 may operate via a decentralized control structure. Additionally, the device network 16 may correspond to a centralized or hierarchical communication interface wherein one or more of the connected devices 252 communicate via the device hub 18 (e.g., a router or communication routing controller). Accordingly, the device network 16 may be implemented via a variety of communication protocols in various combinations, including but not limited to, global system for mobile communication (GSM), general packet radio services (GPRS), Code division multiple access (CDMA), enhanced data GSM environment (EDGE), fourth-generation (4G) wireless, fifth-generation (5G) wireless, Bluetooth®, Bluetooth® low energy (BLE), Wi-Fi, world interoperability for microwave access (WiMAX), local area network (LAN), Ethernet, etc. By flexibly implementing the device network, the monitoring apparatus 14 may be in communication with one or more of the connected devices 252 and the remote server 68 directly and/or via the device hub 18.

The mobile device 20 may correspond to a mobile communication device (e.g., cell phone, tablet, smartphone, etc.). In some embodiments, electronic communication devices may include other mobile electronic devices, such as laptops, personal computers, and/or other devices. The mobile device 20 may be configured to run various software applications configured to control the settings of the monitoring apparatus 14, the accessory module(s) 272, and communicate control parameters for connected devices 252 as identified via the onboard software applications or based on instructions received from the remote server 68. Software operating on the mobile device 20 may enable the control of multiple monitoring apparatuses and/or discrete systems, which may be separately monitored and tracked for operation and consumption. Accordingly, the mobile device 20 in combination with the monitoring apparatus(es) 14 may be configured to facilitate a variety of coordinated control routines including scheduled operations and activities for the connected devices 252, which may reside in a common location and/or be distributed over a variety of locations.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A water supply monitoring system in connection with a supply line for a plurality of water consumption implements, the system comprising:
   a fluid sensor configured to identify flow rate data indicating a flow rate of water through the supply line to the water consumption implements; and
   a controller configured to:
      receive the flow rate data from the fluid sensor;
      compare the flow rate data over time to a plurality of flow rate profiles, wherein the flow rate profiles define flow rate characteristics of the plurality of water consumption implements, wherein the flow rate profiles comprise characteristic curves represented by a slope of the flow rate characteristics of a plurality of flow segments comprising an activation segment, a steady operating segment, and a deactivation segment and distinguish the flow rate data between adjacent segments of the flow segments based on changes in the flow rate data indicating at least one inflection point in the slope of the flow rate data;
      in response to the comparison of the flow rate data to the plurality of flow rate profiles, distinguish the water supplied through the supply line among a plurality of use portions attributed to each of the plurality of water consumption implements; and
      classify each of the use portions with one of the plurality of consumption implements in connection with the supply line in a plurality of consumption classifications as classified consumption data.

2. The monitoring system according to claim 1, wherein the controller is further configured to:
store the classified consumption data in a use database as historic data; and
compare the flow rate data for the plurality of consumption classifications to the historic data.

3. The monitoring system according to claim 2, wherein the controller is further configured to:
identify a change in the water consumption associated with at least one of the plurality of consumption classifications.

4. The monitoring system according to claim 3, wherein the controller is further configured to:
in response to one of the changes in the water consumption associated with the at least one of the plurality of consumption classifications exceeding a predetermined limit, outputting a consumption change indication via a user interface.

5. The monitoring system according to claim 4, further comprising:
a control valve configured to control flow rate through the supply line; and
wherein the controller is further configured to:
in response to identifying the water consumption exceeding one of a time and a total volume limit associated with a one-time water use for the plurality of consumption classifications, control the control valve to stop the flow rate through the supply line.

6. The monitoring system according to claim 2, wherein the controller is further configured to:
update at least one of the flow rate profiles based on the classified consumption data via a machine learning procedure.

7. The monitoring system according to claim 6, wherein the controller is further configured to:
generate a plurality of implement specific profiles for the consumption implements by updating the flow rate models; and
classify a portion of the water consumption as implement specific consumption for a specific implement based on a comparison of the flow rate to the implement specific profiles.

8. The monitoring system according to claim 1, wherein the controller is further configured to:
distinguish the use portions as being associated with specific water consumption implements among a plurality of like water consumption implements of the water consumption implements.

9. The monitoring system according to claim 8, wherein the plurality of like water consumption implements comprise at least one of multiple faucets, multiple toilets, or multiple appliances supplied with water via the fluid supply line, and wherein the controller is further configured to:
distinguish the use portions to the specific water consumption implements among at least one of the multiple faucets, the multiple toilets, or the multiple appliances.

10. The monitoring system according to claim 1, wherein the flow segments comprise a combination of two or more of the activation segment, the steady operating segment, and the deactivation segment.

11. The monitoring system according to claim 10, wherein the combination of the flow segments defines at least one of the flow rate profiles identified by the controller as being attributable to the at least one of the consumption implements.

12. The monitoring system according to claim 11, wherein the inflection point of the flow rate data identified by the controller as a time indicator indicating a start time of a leak or malfunction.

13. A method for monitoring a supply line, the method comprising:
receiving flow rate data from a fluid sensor in connection with a fluid supply line that delivers fluid to a plurality of water consumption implements;
comparing the flow rate data over time to a plurality of flow rate models, wherein the flow rate models define flow rate characteristics of the plurality of water consumption implements, wherein the flow rate characteristics include a representative slope of the flow rate characteristics of a plurality of flow segments comprising an activation segment, a steady operating segment, and a deactivation segment and distinguish the flow rate data between adjacent segments of the plurality of flow segments based on changes in the flow rate data indicating at least one inflection point in the slope of the flow rate data;
in response to the comparison of the flow rate data to the plurality of flow rate models, distinguishing the water supplied through the supply line as a plurality of use portions attributed among each of the plurality of water consumption implements;
classifying each of the use portions as being consumed by one of the plurality of consumption implements in connection with the supply line in a plurality of consumption classifications;
comparing the flow rate data for the plurality of consumption classifications to historic data;
identifying a change in the flow rate model associated with at least one of the water consumption implements based on the comparison;
generating an updated flow rate model based on the change for the at least one of the water consumption implements; and
in response to the updated flow rate model, identifying a later use associated with the at least water consumption implement based on the updated flow rate model.

14. A water supply monitoring system in connection with a supply line configured to supply water to a plurality of consumption implements, the system comprising:
a fluid sensor configured to identify flow rate data identifying a flow rate of water through the supply line; and
a controller configured to:
receive the flow rate data from the fluid sensor;
compare the flow rate data over time to a plurality of flow rate models, wherein the flow rate models define flow rate characteristics of a plurality of preconfigured water implements;
classify water consumption identified by the flow rate data as being consumed by a plurality of consumption implements in connection with the supply line in a plurality of consumption classifications;
store the classified consumption data for at least one of the water consumption implements;
identify changes in the flow rate model over time for the at least one water consumption implement;
generate an updated flow rate model based on the changes for the at least one of the water consumption implements;
in response to the updated flow rate model, identify a later use associated of the at least water consumption implement based on the updated flow rate model; and distinguish the changes associated with a conforming condition used to update the flow rate profile based on the changes from a nonconforming condition comprising a leak or a malfunction of the at least one water consumption implement, wherein the nonconforming condition is defined based on a comparison of the flow rate data to at least one of a time threshold and a flow rate threshold.

15. The water supply monitoring system according to claim 14, wherein the controller is further configured to:
output an alert identifying the nonconforming condition of the at least one water consumption implement.

* * * * *